United States Patent
Cain

(10) Patent No.: US 10,217,987 B2
(45) Date of Patent: Feb. 26, 2019

(54) SYSTEMS AND METHODS FOR MANUFACTURING BATTERY PARTS

(71) Applicant: Water Gremlin Company, White Bear Township, MN (US)

(72) Inventor: Tracy L. Cain, Forest Lake, MN (US)

(73) Assignee: Water Gremlin Company, White Bear Township, MN (US)

( * ) Notice: Subject to any disclaimer, the term of this patent is extended or adjusted under 35 U.S.C. 154(b) by 0 days.

(21) Appl. No.: 15/924,132

(22) Filed: Mar. 16, 2018

(65) Prior Publication Data

US 2018/0205063 A1    Jul. 19, 2018

Related U.S. Application Data

(62) Division of application No. 14/218,695, filed on Mar. 18, 2014, now Pat. No. 9,954,214.

(Continued)

(51) Int. Cl.
*H01M 2/30* (2006.01)
*H01M 10/04* (2006.01)
*B23Q 1/25* (2006.01)

(52) U.S. Cl.
CPC ......... *H01M 2/30* (2013.01); *H01M 10/0404* (2013.01); *B23Q 1/25* (2013.01); *Y10T 29/53135* (2015.01)

(58) Field of Classification Search
CPC ............... H01M 2/30; H01M 10/0404; Y10T 29/53135; B23Q 1/25
See application file for complete search history.

(56) References Cited

U.S. PATENT DOCUMENTS 1,248,768 A    12/1917 Willard
1,326,936 A    1/1920 Jeans et al.
(Continued)

FOREIGN PATENT DOCUMENTS

CA    645083    7/1962
CA    2103759    3/1994
(Continued)

OTHER PUBLICATIONS

Gould Drawing No. 8RD5538, "Cold Forged Positive Lead Terminal Bushing For Plastic Covers", Gould Auto. Div., St. Paul, Minn., May 3, 1974.

(Continued)

*Primary Examiner* — Lisa S Park
(74) *Attorney, Agent, or Firm* — Perkins Coie LLP

(57) ABSTRACT

Systems and methods for producing battery parts, such as battery parts, are described herein. In one embodiment, a battery part machine is configured transform a profile of one or more acid rings on a battery part from a first cross-section to a second cross-section. The machine can include a rotatable spindle configured to receive the battery part, and a first tool and a second tool configured to engage the battery part. The orientation of the first tool and the second tool can be configured to engage the battery part at adjustable to polish, crimp, flare or otherwise transform the profile of the acid rings thereon to produce a finished battery part. An operator can input operating parameters to a machine controller to adjust the finished profile of the acid rings produced by the machine without requiring disassembly thereof.

20 Claims, 12 Drawing Sheets

Related U.S. Application Data

(60) Provisional application No. 61/794,186, filed on Mar. 15, 2013.

(56) References Cited

U.S. PATENT DOCUMENTS

| | | |
|---|---|---|
| 1,411,414 A | 4/1922 | Cook |
| 1,947,158 A | 2/1934 | Henry |
| 1,982,801 A | 12/1934 | Gerking |
| 1,983,618 A | 12/1934 | Lamond |
| 2,100,333 A | 11/1937 | Hess |
| 2,194,092 A | 3/1940 | Lund et al. |
| 2,500,556 A | 3/1950 | Mallach |
| 2,510,100 A | 6/1950 | Goss |
| 2,599,706 A | 6/1952 | Friedman |
| 2,678,960 A | 5/1954 | Jensen |
| 2,901,527 A | 8/1959 | Mocas |
| 3,096,579 A | 7/1963 | Waller |
| 3,101,534 A | 8/1963 | Lange |
| 3,113,892 A | 12/1963 | Albrecht |
| 3,186,209 A | 6/1965 | Friedman |
| 3,280,613 A | 10/1966 | Schrom |
| 3,292,218 A | 12/1966 | Kozma, Jr. |
| 3,344,848 A | 10/1967 | Hall et al. |
| 3,381,515 A | 5/1968 | Orloff |
| 3,534,802 A | 10/1970 | Carr |
| 3,554,272 A | 1/1971 | Lauth |
| 3,709,459 A | 1/1973 | Bushrod |
| 3,736,642 A | 6/1973 | Miller et al. |
| 3,744,112 A | 7/1973 | Lindenberg et al. |
| 3,748,935 A | 7/1973 | Beauchet |
| 3,793,086 A | 2/1974 | Badger |
| 3,808,663 A | 5/1974 | McLane |
| 3,835,686 A | 9/1974 | Lawson et al. |
| 3,842,646 A | 10/1974 | Kuhn |
| 3,847,118 A | 11/1974 | Ambry |
| 3,945,097 A | 3/1976 | Daniels, Jr. et al. |
| 3,945,428 A | 3/1976 | Yanagisawa et al. |
| 3,947,936 A | 4/1976 | Wheadon |
| 3,992,759 A | 11/1976 | Farmer |
| 4,034,793 A | 7/1977 | Okura et al. |
| 4,041,755 A | 8/1977 | Rut |
| 4,049,040 A | 9/1977 | Lynch |
| 4,062,613 A | 12/1977 | Tritenne |
| 4,079,911 A | 3/1978 | Wirtz et al. |
| 4,083,478 A | 4/1978 | McLane |
| 4,100,674 A | 7/1978 | Tiegel |
| 4,146,771 A | 3/1979 | Tiegel |
| 4,160,309 A | 7/1979 | Scholle |
| 4,168,618 A | 9/1979 | Saier et al. |
| 4,177,551 A | 12/1979 | Johnson et al. |
| 4,212,934 A | 7/1980 | Salamon et al. |
| 4,266,597 A | 5/1981 | Eberle |
| 4,284,122 A | 8/1981 | Oxenreider et al. |
| 4,291,568 A | 9/1981 | Stifano, Jr. |
| 4,352,283 A | 10/1982 | Bailey |
| 4,362,043 A | 12/1982 | Hanson |
| 4,377,197 A | 3/1983 | Oxenreider et al. |
| 4,394,059 A | 7/1983 | Reynolds |
| 4,406,146 A | 9/1983 | Suzuki |
| 4,416,141 A | 11/1983 | Nippert |
| 4,422,236 A | 12/1983 | Ware, Jr. et al. |
| 4,423,617 A | 1/1984 | Nippert |
| 4,430,396 A | 2/1984 | Hayes, Jr. |
| 4,469,720 A | 9/1984 | Morris |
| 4,480,393 A | 11/1984 | Flink et al. |
| 4,494,967 A | 1/1985 | Barth |
| 4,495,260 A | 1/1985 | Hardigg et al. |
| 4,497,359 A | 2/1985 | Suzuki et al. |
| 4,505,307 A | 3/1985 | Uchida |
| 4,574,005 A | 3/1986 | Cobbs, Jr. et al. |
| 4,580,431 A | 4/1986 | Oku et al. |
| 4,592,405 A | 6/1986 | Allen |
| 4,600,608 A | 7/1986 | Ankrett |
| 4,610,581 A | 9/1986 | Heinlein |
| 4,614,630 A | 9/1986 | Pluim, Jr. |
| 4,662,205 A | 5/1987 | Ratte |
| 4,683,647 A | 8/1987 | Brecht et al. |
| 4,744,540 A | 5/1988 | Salamon et al. |
| 4,753,283 A | 6/1988 | Nakano |
| 4,775,604 A | 10/1988 | Dougherty et al. |
| 4,776,197 A | 10/1988 | Scott et al. |
| 4,779,443 A | 10/1988 | Hoshi |
| 4,779,665 A | 10/1988 | Ouimet |
| 4,835,711 A | 5/1989 | Hutchins et al. |
| 4,852,634 A | 8/1989 | Kawai et al. |
| 4,859,216 A | 8/1989 | Fritsch |
| 4,859,547 A | 8/1989 | Adams et al. |
| 4,874,032 A | 10/1989 | Hatamura |
| 4,879,191 A | 11/1989 | Sindorf |
| 4,938,276 A | 7/1990 | Noguchi et al. |
| 4,945,749 A | 8/1990 | Walker et al. |
| 4,967,827 A | 11/1990 | Campbell |
| 4,998,206 A | 3/1991 | Jones et al. |
| 5,016,460 A | 5/1991 | England et al. |
| 5,048,590 A | 9/1991 | Carter |
| 5,072,772 A | 12/1991 | Haehne |
| 5,074,352 A | 12/1991 | Suzuki |
| 5,077,892 A | 1/1992 | Nugent |
| 5,079,967 A | 1/1992 | LaCava |
| 5,108,668 A | 4/1992 | Kallup |
| 5,125,450 A | 6/1992 | Kidd et al. |
| 5,143,141 A | 9/1992 | Frulla |
| 5,146,974 A | 9/1992 | Mayer et al. |
| 5,170,835 A | 12/1992 | Eberle et al. |
| 5,180,643 A | 1/1993 | Nedbal |
| 5,244,033 A | 9/1993 | Ueno |
| 5,273,845 A | 12/1993 | McHenry et al. |
| 5,290,646 A | 3/1994 | Asao et al. |
| 5,296,317 A | 3/1994 | Ratte et al. |
| 5,316,505 A | 5/1994 | Kipp |
| 5,326,655 A | 7/1994 | Mix et al. |
| 5,343,927 A | 9/1994 | Ivansson |
| 5,349,840 A | 9/1994 | Ratte et al. |
| 5,373,720 A | 12/1994 | Ratte et al. |
| 5,380,603 A | 1/1995 | Hooke |
| 5,415,219 A | 5/1995 | Wiedenmann et al. |
| 5,422,202 A | 6/1995 | Spiegelberg et al. |
| 5,445,907 A | 8/1995 | Ito et al. |
| 5,458,032 A | 10/1995 | Spiegelberg |
| 5,499,449 A | 3/1996 | Carter et al. |
| 5,511,605 A | 4/1996 | Iwamoto |
| 5,580,685 A | 12/1996 | Schenk |
| 5,584,730 A | 12/1996 | Tabata et al. |
| 5,595,511 A | 1/1997 | Okada et al. |
| 5,606,887 A | 3/1997 | Spiegelberg et al. |
| 5,623,984 A | 4/1997 | Nozaki et al. |
| 5,632,173 A | 5/1997 | Spiegelberg et al. |
| 5,655,400 A | 8/1997 | Spiegelberg et al. |
| 5,660,946 A | 8/1997 | Kump et al. |
| 5,663,015 A | 9/1997 | Hooke et al. |
| 5,671,797 A | 9/1997 | Nozaki et al. |
| 5,672,442 A | 9/1997 | Burnett |
| 5,686,202 A | 11/1997 | Hooke et al. |
| 5,704,119 A | 1/1998 | Ratte et al. |
| 5,709,967 A | 1/1998 | Larsen |
| 5,725,043 A | 3/1998 | Schaefer et al. |
| 5,730,203 A | 3/1998 | Mogensen |
| 5,746,267 A | 5/1998 | Yun et al. |
| 5,752,562 A | 5/1998 | Sparks |
| 5,758,711 A | 6/1998 | Ratte |
| 5,778,962 A | 7/1998 | Garza-Ondarza et al. |
| 5,785,110 A | 7/1998 | Guergov |
| 5,791,183 A | 8/1998 | Spiegelberg et al. |
| 5,814,421 A | 9/1998 | Spiegelberg et al. |
| 5,836,372 A | 11/1998 | Kono |
| 5,862,853 A | 1/1999 | Eliat |
| 5,887,641 A | 3/1999 | Iwamoto et al. |
| 5,908,065 A | 6/1999 | Chadwick et al. |
| 5,924,471 A | 7/1999 | Lund et al. |
| 6,001,506 A | 12/1999 | Timmons et al. |
| 6,030,723 A | 2/2000 | Nagano et al. |
| 6,033,801 A | 3/2000 | Casais |
| 6,082,937 A | 7/2000 | Ratte |
| 6,123,142 A | 9/2000 | Ratte |

(56) References Cited

U.S. PATENT DOCUMENTS

| | | |
|---|---|---|
| 6,152,785 A | 11/2000 | Haller et al. |
| 6,155,889 A | 12/2000 | Scarla et al. |
| 6,183,905 B1 | 2/2001 | Ling et al. |
| 6,202,733 B1 | 3/2001 | Ratte |
| 6,255,617 B1 | 7/2001 | Farmer et al. |
| 6,258,481 B1 | 7/2001 | Ross et al. |
| 6,267,171 B1 | 7/2001 | Onuki et al. |
| 6,363,996 B1 | 4/2002 | Ratte |
| 6,405,786 B1 | 6/2002 | Ratte |
| 6,499,530 B2 | 12/2002 | Ratte |
| 6,506,448 B1 | 1/2003 | Minogue |
| 6,513,570 B2 | 2/2003 | Ratte |
| 6,564,853 B1 | 5/2003 | Ratte |
| 6,598,658 B2 | 7/2003 | Ratte |
| 6,613,163 B1 | 9/2003 | Pfeifenbring et al. |
| 6,644,084 B1* | 11/2003 | Spiegelberg et al. .. B23D 21/00 |
| 6,684,935 B2 | 2/2004 | Ratte |
| 6,701,998 B2 | 3/2004 | Ratte |
| 6,803,146 B2 | 10/2004 | Key et al. |
| 6,806,000 B2 | 10/2004 | Misra et al. |
| 6,830,490 B2 | 12/2004 | Murakami et al. |
| 6,864,015 B2 | 3/2005 | Peterson et al. |
| 6,866,087 B2 | 3/2005 | Ratte |
| 6,896,031 B2 | 5/2005 | Ratte |
| 6,902,095 B2 | 6/2005 | Ratte et al. |
| 6,908,640 B2 | 6/2005 | Ratte et al. |
| 6,929,051 B2 | 8/2005 | Peterson et al. |
| 6,982,131 B1 | 1/2006 | Hamada et al. |
| 6,997,234 B2 | 2/2006 | Peterson |
| 7,021,101 B2 | 4/2006 | Spiegelberg |
| 7,029,589 B2 | 4/2006 | McGinness |
| 7,070,441 B1 | 7/2006 | Gregory et al. |
| 7,074,516 B2 | 7/2006 | Davidson et al. |
| 7,163,763 B2 | 1/2007 | Spiegelberg et al. |
| 7,163,764 B2 | 1/2007 | Ratte |
| 7,246,650 B2 | 7/2007 | Peterson |
| 7,338,539 B2 | 3/2008 | Ratte et al. |
| 7,390,364 B2 | 6/2008 | Ratte et al. |
| 8,202,328 B2 | 6/2012 | Ratte et al. |
| 8,497,036 B2 | 7/2013 | Garin et al. |
| 8,512,891 B2 | 8/2013 | Ratte |
| 8,701,743 B2 | 4/2014 | Ratte et al. |
| 8,802,282 B2 | 8/2014 | Garin et al. |
| 9,034,508 B2 | 5/2015 | Ratte |
| 9,190,654 B2 | 11/2015 | Ratte et al. |
| 9,954,214 B2 | 4/2018 | Cain |
| 2001/0031394 A1 | 10/2001 | Hansen et al. |
| 2002/0002772 A1 | 1/2002 | Hirano et al. |
| 2002/0114994 A1 | 8/2002 | Yabuki et al. |
| 2003/0017391 A1 | 1/2003 | Peterson et al. |
| 2003/0017392 A1 | 1/2003 | Key et al. |
| 2003/0207172 A1 | 11/2003 | Misra et al. |
| 2003/0224248 A1 | 12/2003 | Spiegelberg et al. |
| 2004/0044071 A1 | 3/2004 | Fischer et al. |
| 2005/0042509 A1 | 2/2005 | Key et al. |
| 2005/0084751 A1 | 4/2005 | Ratte |
| 2005/0147881 A1 | 7/2005 | Ratte et al. |
| 2005/0147882 A1 | 7/2005 | Ratte et al. |
| 2005/0153202 A1 | 7/2005 | Ratte et al. |
| 2005/0155737 A1 | 7/2005 | Ratte |
| 2005/0238955 A1 | 10/2005 | Hooke et al. |
| 2006/0068279 A1 | 3/2006 | Spiegelberg et al. |
| 2006/0127693 A1 | 6/2006 | Peslerbe et al. |
| 2008/0038633 A1 | 2/2008 | Ratte et al. |
| 2009/0047574 A1 | 2/2009 | Hellmann |
| 2009/0229781 A1 | 9/2009 | Ratte |
| 2009/0246618 A1 | 10/2009 | Dirks |
| 2010/0033239 A1 | 2/2010 | Nakagawa et al. |
| 2010/0116455 A1 | 5/2010 | Ratte et al. |
| 2010/0291435 A1 | 11/2010 | Garin et al. |
| 2011/0045336 A1 | 2/2011 | Ratte et al. |
| 2011/0174459 A1 | 7/2011 | Garin et al. |
| 2011/0250493 A1 | 10/2011 | Balzan et al. |
| 2011/0262806 A1 | 10/2011 | Balzan et al. |
| 2013/0029213 A1 | 1/2013 | Cain et al. |
| 2014/0083642 A1 | 3/2014 | Ratte |
| 2014/0201981 A1 | 7/2014 | Ratte et al. |
| 2014/0259646 A1 | 9/2014 | Cain |
| 2014/0322594 A1 | 10/2014 | Garin et al. |
| 2016/0126527 A1 | 5/2016 | Ratte |

FOREIGN PATENT DOCUMENTS

| | | |
|---|---|---|
| CA | 2459031 | 3/1994 |
| CA | 2558525 | 4/2007 |
| CH | 321596 | 5/1957 |
| CH | 371154 | 8/1963 |
| DE | 523104 | 4/1931 |
| DE | 1146149 B | 3/1963 |
| DE | 2645977 | 4/1978 |
| DE | 134330 C | 2/1979 |
| DE | 3132292 A1 | 3/1983 |
| DE | 3230628 | 12/1983 |
| DE | 3401354 | 7/1985 |
| DE | 3502675 | 7/1986 |
| DE | 3942175 | 6/1991 |
| DE | 4127956 | 2/1993 |
| DE | 4241393 | 7/1994 |
| DE | 19635075 A1 | 3/1998 |
| EP | 0040951 | 12/1981 |
| EP | 0117213 A1 | 8/1984 |
| EP | 0244683 | 11/1987 |
| EP | 0261311 | 3/1988 |
| EP | 0284068 A1 | 9/1988 |
| EP | 0319128 | 3/1989 |
| EP | 0344042 A1 | 11/1989 |
| EP | 0448792 A2 | 10/1991 |
| EP | 0559920 | 9/1993 |
| EP | 0590284 | 4/1994 |
| EP | 0601268 | 6/1994 |
| EP | 0633081 | 1/1995 |
| EP | 0809327 | 11/1997 |
| EP | 0878856 | 11/1998 |
| EP | 0941554 | 9/1999 |
| EP | 1291940 | 3/2003 |
| EP | 1700354 | 9/2006 |
| ES | 2097388 T3 | 4/1997 |
| FR | 2504424 | 10/1982 |
| GB | 297904 | 10/1928 |
| GB | 386159 A | 1/1933 |
| GB | 1236495 | 6/1971 |
| GB | 1245255 A | 9/1971 |
| GB | 1257963 A | 12/1971 |
| GB | 1352882 | 5/1974 |
| GB | 2141654 | 1/1985 |
| GB | 2315695 | 2/1998 |
| JP | 54144931 A | 11/1979 |
| JP | 55057259 | 4/1980 |
| JP | 56159054 | 12/1981 |
| JP | 56165359 A | 12/1981 |
| JP | 58209861 A | 12/1983 |
| JP | 59029357 | 2/1984 |
| JP | 61008846 | 1/1986 |
| JP | 61096660 | 5/1986 |
| JP | 61189860 | 8/1986 |
| JP | 01124954 | 5/1989 |
| JP | 01239762 | 9/1989 |
| JP | 01243369 | 9/1989 |
| JP | 2155557 | 6/1990 |
| JP | 02234347 | 9/1990 |
| JP | 2247036 A | 10/1990 |
| JP | 03049152 | 3/1991 |
| JP | 03263756 | 11/1991 |
| JP | 4135042 | 5/1992 |
| JP | 04206459 | 7/1992 |
| JP | 04223047 | 8/1992 |
| JP | 05283057 | 10/1993 |
| JP | 05325940 | 12/1993 |
| JP | 06015402 | 1/1994 |
| JP | 06020663 | 1/1994 |
| JP | 06196136 | 7/1994 |
| JP | 06223812 | 8/1994 |
| JP | 07211308 | 8/1995 |
| JP | 7211309 | 8/1995 |

(56) References Cited

FOREIGN PATENT DOCUMENTS

| | | |
|---|---|---|
| JP | 7235286 A | 9/1995 |
| JP | 08171897 | 7/1996 |
| JP | 08273656 | 10/1996 |
| JP | 09045309 | 2/1997 |
| JP | 09130460 | 5/1997 |
| JP | 09167610 | 6/1997 |
| JP | 09237615 | 9/1997 |
| JP | 09312151 | 12/1997 |
| JP | 09320630 | 12/1997 |
| JP | 10116602 | 5/1998 |
| JP | 10144289 | 5/1998 |
| JP | 10208714 | 8/1998 |
| JP | 11045698 | 2/1999 |
| JP | 11045699 | 2/1999 |
| JP | 11135102 | 5/1999 |
| JP | 11176415 | 7/1999 |
| JP | 2000021367 | 1/2000 |
| JP | 2000164199 | 6/2000 |
| JP | 2001256955 A | 9/2001 |
| JP | 2001307714 | 11/2001 |
| JP | 2001006655 | 12/2001 |
| JP | 2002025536 | 1/2002 |
| JP | 2002050327 | 2/2002 |
| JP | 2002175795 | 6/2002 |
| JP | 2002270150 | 9/2002 |
| JP | 2003007281 | 1/2003 |
| JP | 2003242946 | 8/2003 |
| JP | 2003317677 | 11/2003 |
| JP | 2003317698 | 11/2003 |
| JP | 2003346777 | 12/2003 |
| JP | 2003346778 | 12/2003 |
| JP | 2004039401 | 2/2004 |
| JP | 2004228013 | 8/2004 |
| JP | 2004228046 | 8/2004 |
| JP | 2004235050 | 8/2004 |
| JP | 2004281145 | 10/2004 |
| JP | 2005078856 | 3/2005 |
| JP | 2005116243 | 4/2005 |
| JP | 2005116387 | 4/2005 |
| JP | 2005142009 | 6/2005 |
| JP | 2006331784 | 12/2006 |
| JP | 2007157611 A | 6/2007 |
| KR | 2038630 | 5/2002 |
| KR | 3044813 | 6/2003 |
| SU | 688279 A1 | 9/1979 |
| WO | WO-94/02272 | 2/1994 |
| WO | WO-99/07029 | 2/1999 |
| WO | WO-2005067513 | 7/2005 |
| WO | WO-2005119813 A2 | 12/2005 |
| WO | WO-2008032348 | 3/2008 |
| WO | WO-2009142621 A1 | 11/2009 |
| WO | WO-2010033239 A1 | 3/2010 |
| WO | WO-2010127289 A1 | 11/2010 |

OTHER PUBLICATIONS

Gould Drawing No. 8RD5539, "Cold Forged Negative Lead Terminal Bushing For Plastic Covers", Gould Auto. Div., St. Paul, Minn., May 3, 1974.

Heller, Machine translation of EP 0601268—May 1993, EPO, 2 pages.

HPM Corporation, HPM Tech Data—Thixomolding. Feb. 1992, 1 page.

Lindberg Corporation. Press Release: Thixomolding Processes Establishes Production Benchmarks, 1993, 5 pages, Illinois.

"jon jon ABBISS" video "Hapfo 500 Copy Lathe Part 2" https://www.youtube.com/watch?v=TSJ-jgHMflU, Mar. 2012.

USPTO Non-Final Office Action dated Jun. 30, 2017 for U.S. Appl. No. 14/218,695, 40 pages.

\* cited by examiner

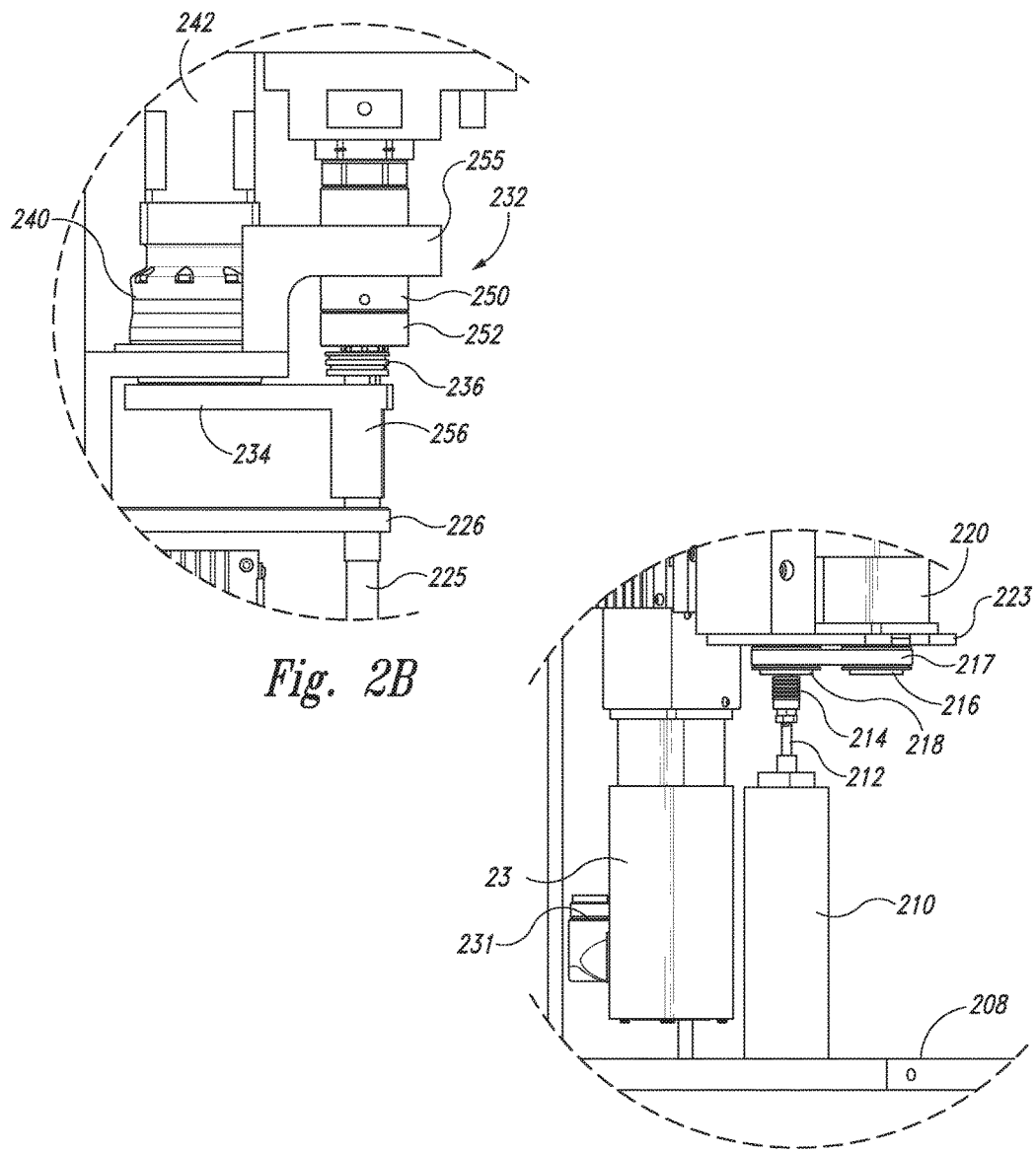

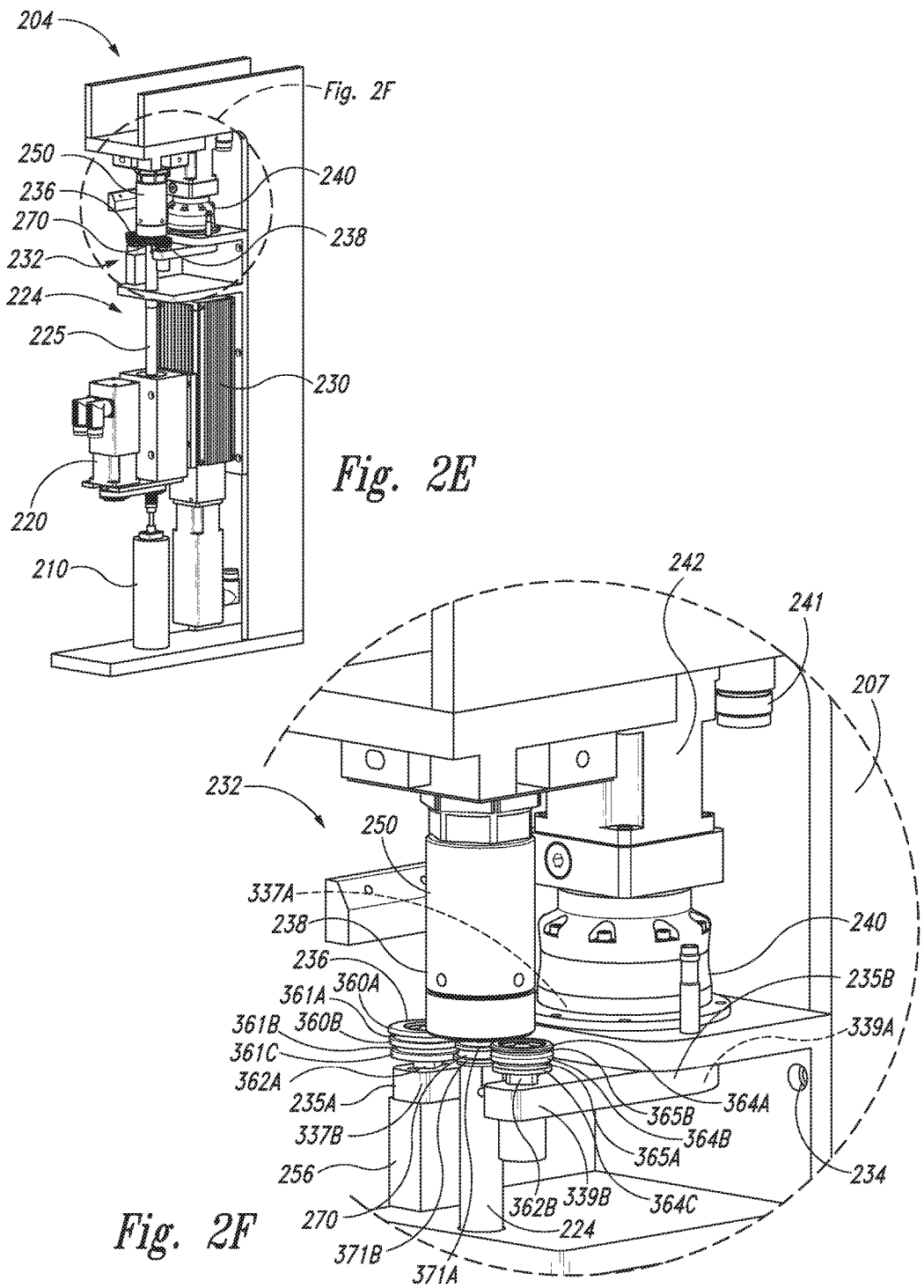

SYSTEMS AND METHODS FOR MANUFACTURING BATTERY PARTS

CROSS-REFERENCE TO RELATED APPLICATION(S)

This present application is a divisional of U.S. patent application Ser. No. 14/218,695, filed Mar. 18, 2014, now U.S. Pat. No. 9,954,214, which claims priority to U.S. Provisional Patent Application No. 61/794,186, filed Mar. 15, 2013, and entitled "SYSTEMS AND METHODS FOR MANUFACTURING BATTERY PARTS", both of which are incorporated herein by reference in their entirety.

PATENTS AND PATENT APPLICATIONS INCORPORATED BY REFERENCE

The following patents and patent applications are incorporated herein by reference in their entireties: U.S. Pat. No. 7,338,539, titled "DIE CAST BATTERY TERMINAL AND A METHOD OF MAKING," and filed Mar. 18, 2004; U.S. patent application Ser. No. 11/058,625, titled "MULTIPLE CASTING APPARATUS AND METHOD," and filed Feb. 15, 2005; U.S. Pat. No. 7,838,145, titled "BATTERY PART," and filed Oct. 9, 2007; U.S. patent application Ser. No. 12/470,636, titled "MULTIPLE CASTING APPARATUS AND METHOD," and filed May 21, 2009; U.S. patent application Ser. No. 12/533,413, titled "BATTERY PARTS AND ASSOCIATED SYSTEMS AND METHODS," and filed Jul. 31, 2009; U.S. Pat. No. 8,202,328, titled "BATTERY PART," and filed Oct. 18, 2010; U.S. patent application Ser. No. 13/046,649, titled "BATTERY PARTS AND ASSOCIATED METHODS OF MANUFACTURE AND USE," and filed Mar. 11, 2011; and U.S. patent application Ser. No. 13/539,159, titled "BATTERY PARTS HAVING RETAINING AND SEALING FEATURES AND ASSOCIATED METHODS OF MANUFACTURE AND USE," and filed Jun. 29, 2012.

TECHNICAL FIELD

This invention relates generally to systems and methods for making battery parts and, more specifically, to systems and methods for forming one or more acid rings on battery parts.

BACKGROUND

Battery parts, such as battery terminals, may be cold formed or die cast. Battery terminals are typically secured to a battery container with a portion of the battery terminal located inside the container and a further portion located outside the container. The battery container, which is typically made from plastic (e.g., polyethylene), is molded around a set of acid rings that are located on the portion of the terminal that is located within the container. The acid rings can provide an extended interface and consequently a tortuous path to inhibit or prevent electrolyte from escaping from the battery container. Because the acid must follow a tortuous path to escape the container, a concentric acid ring seal is often referred to as a labyrinth seal.

Prior art methods for forming acid rings on battery terminals typically include dedicated tooling systems for a producing a particular type of acid ring. These tooling systems may require shutdown and/or disassembly to change characteristics (e.g., pattern, number of acid rings, shape, size, etc.) of the acid ring(s) formed on the battery terminals. Shutdown or disassembly can result in, for example, undesired delays in battery terminal production. Accordingly, a need exists for systems and methods capable of modifying a battery terminal acid ring characteristic formed therefrom without disassembly.

BRIEF DESCRIPTION OF THE DRAWINGS

FIG. 2B is an enlarged view taken from FIG. 2A.

FIG. 2D is taken from FIG. 2C.

FIG. 2E is an isometric side view of the machine of FIG. 2A, and FIG. 2F is an enlarged view taken from FIG. 2E showing a battery part forming assembly configured in accordance with an embodiment of the present disclosure.

DETAILED DESCRIPTION

Figure 1:
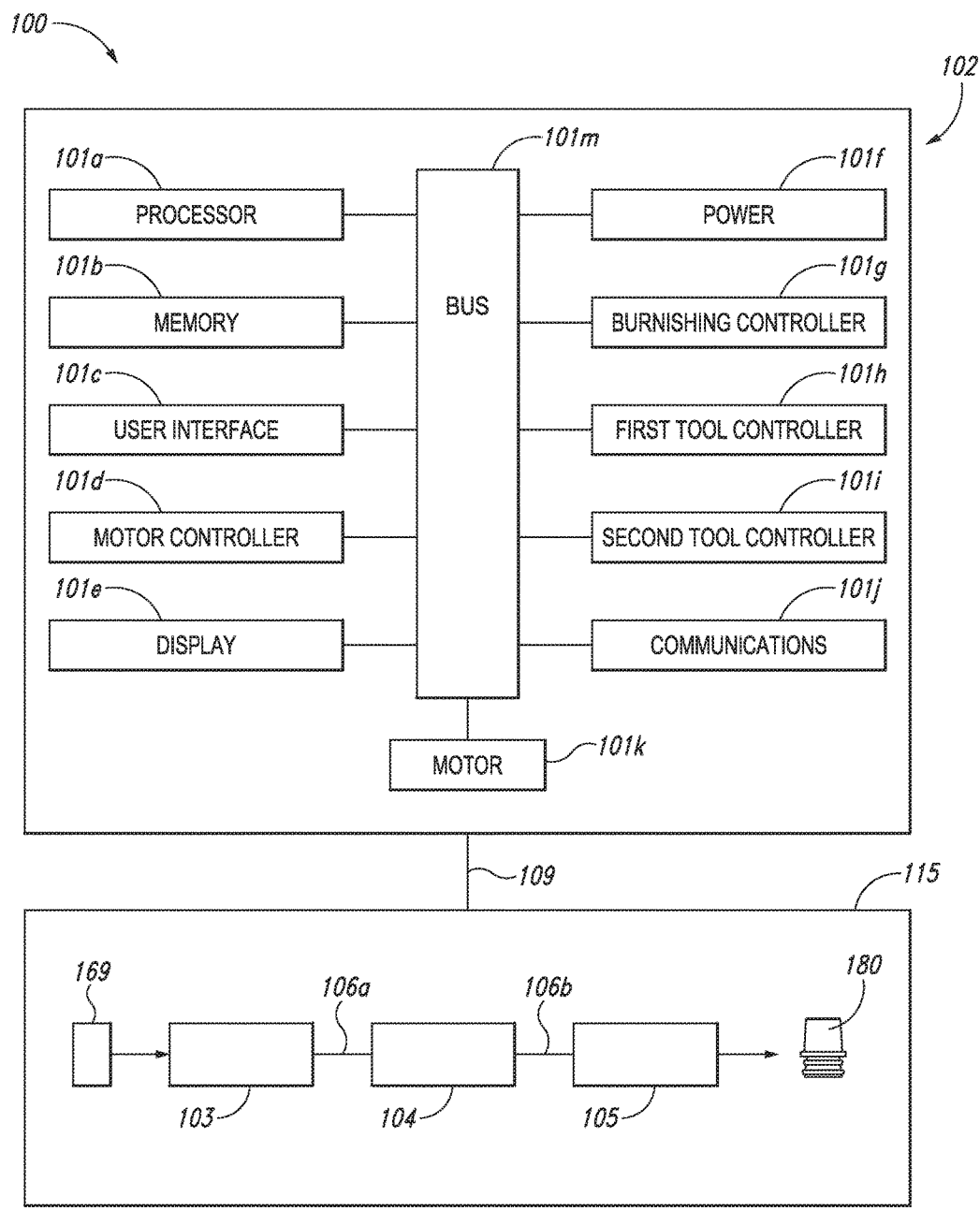
FIG. 1 is a block diagram of a battery part manufacturing system configured in accordance with one or more embodiments of the present disclosure.

The following disclosure describes various embodiments of battery parts, such as battery terminals or bushings and the like, and associated methods of manufacture and use. In one embodiment, the battery part includes several sealing portion or sealing features (e.g., sealing rings and/or acid rings) on a base portion of the battery part. Plastic material can be molded around the base portion to form a battery container that can contain electrolyte or other fluid. The sealing features can create an indirect, tortuous path that prevents the battery fluid from leaking from the container.

In one embodiment of the present disclosure, a battery part includes a body having a base portion configured to be embedded in battery container material when the corresponding battery container is formed. The base portion can include undercut acid rings, each having a root and a lip. The lip can flare outwardly from the root to define an undercut between the root and the lip of the acid ring. In some embodiments, the base portion of the battery part can include adjacent acid rings having opposing undercuts defined by the overlapping lips of the adjacent acid rings.

In another embodiment of the present disclosure, a battery part manufacturing machine includes a shaft extending from a first end portion to a second end portion, and a motor coupled to the first end portion of the shaft. A fixture fixedly attached to the second end portion of the shaft can be configured to receive and releasably secure a battery part. A tool positioned adjacent the fixture can be configured to be movable in a first direction toward the fixture and in at least a second direction away from the fixture. The tool can include a forming portion configured to engage a sealing feature of a battery part.

In yet another embodiment of the present disclosure, a battery part manufacturing system includes a first station and a second station. The first station can be configured to form a lead workpiece into a battery part that includes at least a first sealing ring having a profile with a first shape. The second station can be configured to receive the battery part. The second station includes a fixture configured to receive and releasably secure the battery part and a tool positioned adjacent the fixture. The tool can include a forming portion configured to engage the sealing feature of the battery part. The forming portion can also be configured to transform the profile of the sealing feature from the first shape to a different second shape. In one aspect of this embodiment, the second station can also include a spindle extending from a first end to a second end, wherein the fixture is fixedly attached to the first end. In this aspect, a first motor may be rotatably coupled to the second end of the spindle, and a second motor may be coupled to the first motor. The second motor may be configured to move the fixture in a first direction and a second direction, parallel to a longitudinal axis of the spindle.

In still another embodiment of the present disclosure, a method of manufacturing a battery part can include receiving a battery part having a sealing ring with a profile having a first cross-sectional shape. The method further includes rotating the battery part in a first rotational direction, and moving a tool having a forming portion toward the battery part in a first direction. The method also includes engaging the sealing ring with the forming portion to transform the profile from the first cross-sectional shape to a second, different cross-sectional shape. In some aspects of this embodiment, the method may also include actuating the battery part in a second direction and an opposite third direction a predetermined number of times and/or incrementally moving the tool in the first direction and in an opposite fourth direction a predetermined number of times.

In one other embodiment of the present disclosure, a battery part manufacturing machine includes a plurality of spindle assemblies. The individual spindle assemblies can include a spindle having a first end portion coupled to a rotary motor and a second end portion configured to removably secure a battery part thereto. The machine may also include a platform movable in a first direction toward the spindle assemblies and at least a second direction away from the spindle assemblies. In the platform can include a proximal end portion proximate the spindle assemblies. The machine can further include a plurality of tools arranged on the proximal end portion. Individual tools can include a forming portion configured to engage a sealing feature of a battery part positioned on a corresponding spindle assembly. In some aspects of this embodiment, the machine can also include an actuator configured to move the platform in the first direction and in the second direction. In one aspect, the individual tools may be configured to transform a profile of a sealing feature of a battery part a first cross-sectional shape to a second cross-sectional shape when the tool engages the battery part. In another aspect, the machine may also include a second platform movable in the second direction toward the spindle assemblies and in the first direction away from the spindle assemblies. A plurality of second tools may be arranged on a proximal end portion of the second platform, and individual second tools can include a second forming portion different from the first forming portion.

Certain details are set forth in the following description and in FIGS. 1A-8D to provide a thorough understanding of various embodiments of the disclosure. Other details describing well-known structures and systems often associated with battery parts (e.g., lead and/or lead alloy battery parts, moldable battery containers, etc.), and methods for forming such parts (e.g., forming, casting, injection molding, etc.), as well as other battery parts and assemblies, are not set forth in the following disclosure to avoid unnecessarily obscuring the description of the various embodiments of the disclosure.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention.

In the Figures, identical reference numbers identify identical or at least generally similar elements. Moreover, any of the details, dimensions, angles and/or other portions shown in the Figures are merely illustrative of particular embodiments of the disclosure. Accordingly, other embodiments can have other details, dimensions, angles and/or portions without departing from the scope of the present disclosure. In addition, further embodiments of the disclosure may be practiced without several of the details described below, while still other embodiments of the disclosure may be practiced with additional details and/or portions.

FIG. 1 is a block diagram of a battery part manufacturing system 100 configured in accordance with an embodiment of the present disclosure. The manufacturing system 100 includes a system controller 102 coupled to one or more manufacturing machines 115 by at least a first communication link 109. The system controller 102 can include a processor 101$a$ and a memory 101$b$ (e.g., a computer readable media) configured to store computer-readable instructions. The processor 101$a$ can be configured to execute the instructions to provide operating instructions and/or commands to the various components of the manufacturing system 100 and/or the manufacturing machines 115 and receive information therefrom. A bus 101$m$ can couple the processor 101$a$ to a user interface 101$c$, a motor controller 101$d$, a display 101$e$, and/or a power source 101$f$. The system controller 102 can also include communication component 101$j$ that can be configured to facilitate transmission and receiving of information to and from the manufacturing machines 115. In some embodiments, for example, one or more motors 101$k$ may be directly connected to the processor for control or may be controlled intermediately by the motor controller 101$d$.

A first tool controller 101$h$ and a second tool controller 101$i$ can be coupled to the processor 101$a$ and configured to control tooling operations of a first tool and a second tool, respectively. As described in greater detail below, with reference to FIGS. 2A-3B, the first tool can include a polishing tool and the second tool can include a forming tool configured to engage a battery part and transform a profile of at least a first sealing feature (e.g., an acid ring and/or a sealing ring) on the battery part from a first cross section to a second cross section. A burnishing controller 101g coupled to the processor 101a can be configured to provide instructions for burnishing the battery part before, during, or after the tooling operations.

As set forth above, the communication link 109 couples and/or connects the system controller 102 to a manufacturing machines 115. The communication link 109 can include a wired control means (e.g., a wire, a cable, etc.) and/or wireless control means (e.g., Bluetooth, cellular data, WiFi, WiMAX, ultra-wideband, etc.). In some embodiments, for example, the system controller 102 and the manufacturing machines 115 are housed in the same facility (e.g., a production facility) and connected via the communication link (e.g., a cable, a wired or wireless local area network, WiFi, Bluetooth, etc.). In other embodiments, for example, the communication link 109 can be configured to facilitate control of the manufacturing machines 115 in a first location remote from the system controller 102 at a second location. In one embodiment, for example, the system controller 102 can be located or accessed via the Internet and can allow a user (e.g., an operator, a client, etc.) to input operating parameters (e.g., via a webpage) for a desired finished product to the one or more manufacturing machines 115. The system controller 102 thus allows the user to design one or more desired battery parts in a location remote or distant from a facility housing the manufacturing machines 115.

The manufacturing machines 115 can include a first manufacturing station 103, a second manufacturing station 104, and a third manufacturing station 105. In operation, the first manufacturing station 103 (e.g., a battery part cold forming apparatus, a battery part casting apparatus, a battery part mold injection apparatus, etc.) can receive a workpiece 169 (e.g., a slug) made from a metal (e.g., lead and/or an alloy thereof) or another suitable malleable material. In the illustrated embodiment, the workpiece 169 is a solid material (e.g., a lead slug) that the first manufacturing station 103 forms into a first battery part by, for example, cold forming and/or die-casting. Techniques for forming the first battery part from a lead slug are described, for example, in U.S. Pat. No. 7,338,539, which is incorporated by reference herein in its entirety. In other embodiments, however, the workpiece 169 may comprise a liquid (e.g., molten lead) from which the first manufacturing station 103 can form the first battery part using a technique such as, for example, injection molding. Injection molding techniques for forming the first battery part are described, for example, in U.S. patent application Ser. No. 11/058,625, which is incorporated by reference herein in its entirety.

As discussed in more detail below with reference to FIGS. 4A and 4B, the first battery part can include a lug portion and a base portion, a spline, and/or one or more sealing features. The sealing features may include, for example, one or more acid rings formed circumferentially around an outer surface of the battery part. In some embodiments, the first manufacturing station 103 can produce a circular, cylindrical, and/or generally round battery part. In some embodiments, however, the battery part may have a square and/or rectangular solid shape such as, for example, battery terminals configured for use in motorcycle batteries, tractor batteries, marine batteries, golf cart batteries, etc. In other embodiments, the first battery part produced by first manufacturing station 103 can have any suitable shape (e.g., hexagonal, octagonal, etc.).

A first mover 106a can convey, transport, or otherwise move battery parts from the first manufacturing station 103 to the second manufacturing station 104. Similarly, a second mover 106b can convey or transport battery parts from the second manufacturing station 104 to the third manufacturing station 105. As those of ordinary skill in the art will appreciate, the first mover 106a and the second mover 106b can include, for example, conveyor belts, moving platforms, rotary platforms, robotic arms, robotic grippers, human operators manually moving one battery part from one station to another, etc. As described in further detail below with reference to FIGS. 2A-5, the second manufacturing station 104 can transform a profile of sealing features on the first battery part having from a first cross section (e.g., round, rectangular, etc.) to a second cross section to form, for example, a finished battery part 180. The finished battery part 180 can include one or more sealing features such as, for example, features formed by a roller tool or die (e.g., sealing features having an undercut, an overhang, a whale-tails, a flared end portion, a bifurcated end portion, etc.). After battery part processing and/or formation in the second manufacturing station 104, the battery part 180 can be transferred via the second mover 106b to a third manufacturing station 105. The third manufacturing station 105 can include, for example, a station for further processing or finishing (e.g., polishing) the battery part 180 and/or packaging the battery part 180 for sale.

Figure 2A:
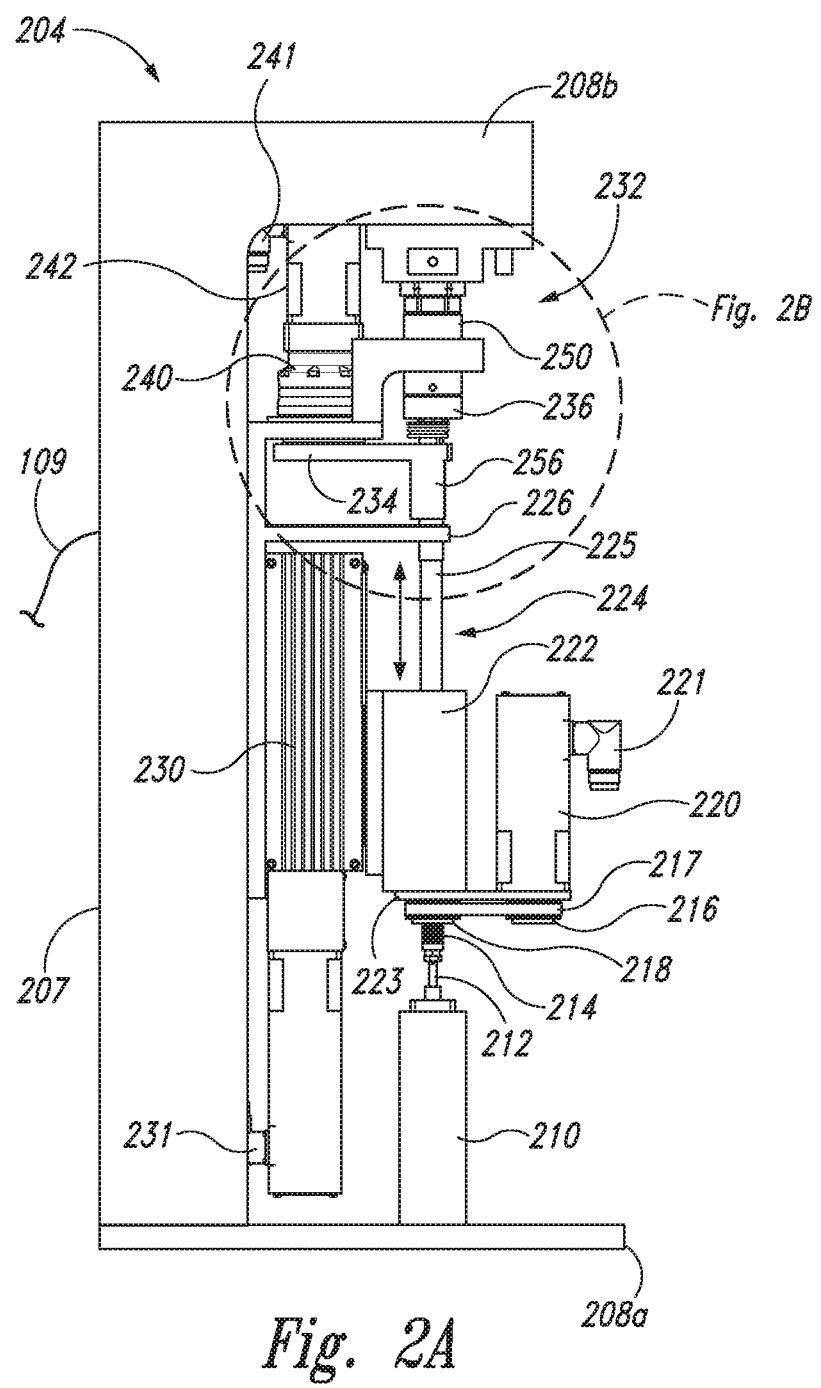
FIG. 2A is a side view of a battery part manufacturing machine configured in accordance with an embodiment of the present disclosure.
Figure 2C:
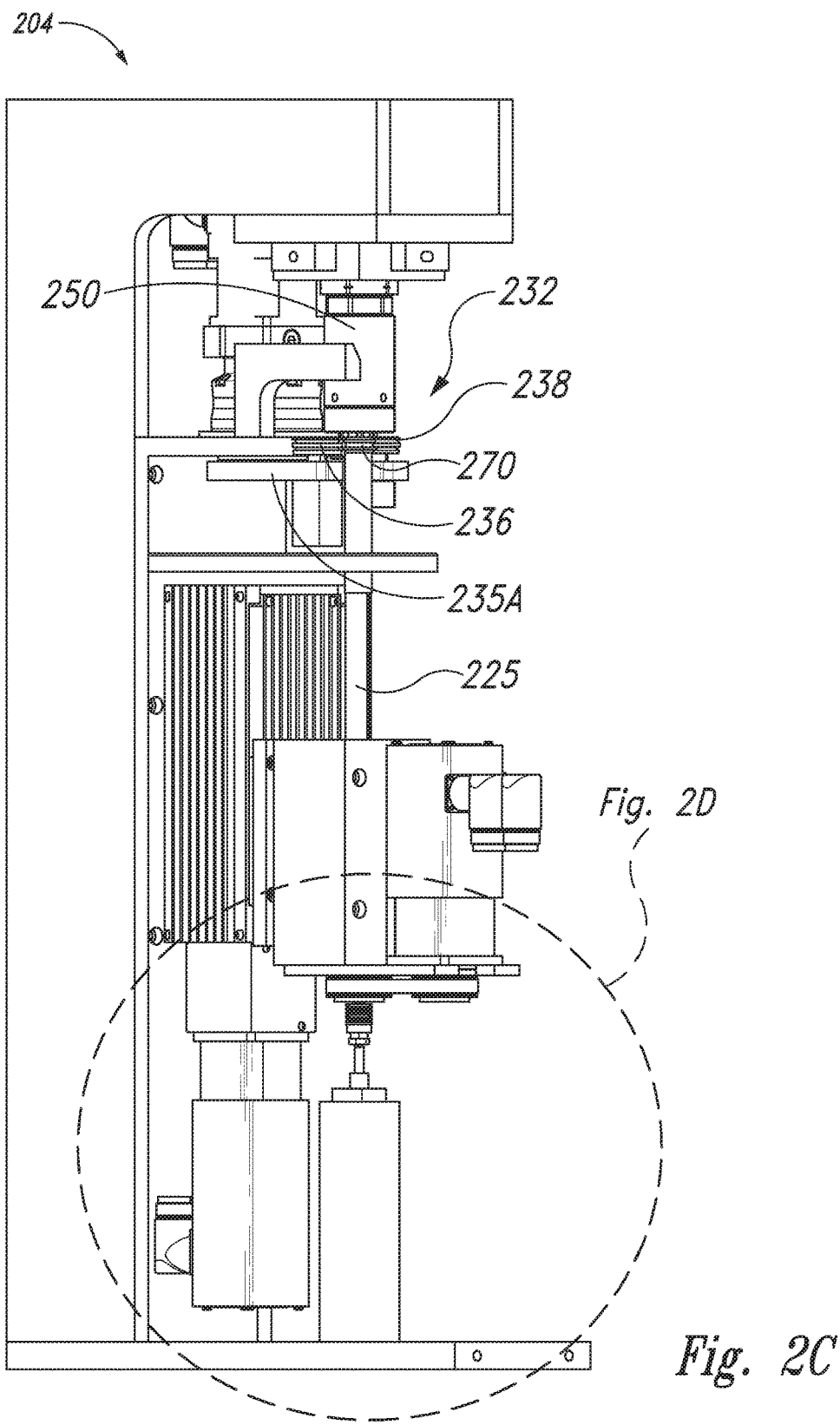
FIG. 2C is an isometric side view of the machine of FIG. 2A.

FIG. 2A is a side view of a battery part manufacturing machine 204 (e.g., the second manufacturing station 104 in FIG. 1) configured in accordance with an embodiment of the present disclosure, and FIG. 2B is an enlarged side view of a portion of the machine 204 from FIG. 2A. FIG. 2C is an isometric side view of the machine 204, and FIG. 2D is an enlarged view of the machine 204 from FIG. 2C. FIG. 2E is an isometric side view of the machine 204, and FIG. 2F is an enlarged view of the machine 204 from FIG. 2E. Referring to FIGS. 2A-2F together, the machine 204 can include a vertical support structure 207 mounted to a base portion 208a. An upper platform 208b extending from an upper portion of the vertical support structure 207 can support one or more machine components mounted thereon.

The machine 204 includes a lathe or a spindle assembly 224 configured to receive and support a first battery part 270 (FIG. 2F), and a tooling assembly 232 configured to engage and/or transform a profile of at least a portion of the battery part 270 from a first cross-sectional shape to a second cross-sectional shape. The battery part 270 can be placed manually on the spindle assembly 224 and/or automatically positioned on the spindle assembly 224 (e.g., via a conveyer, a robotic arm, etc.). The spindle assembly 224 includes a spindle shaft 225 configured to rotatably support the battery part 270 thereon. As described in more detail below in reference to FIG. 3A, a fixture (e.g., a collet) fixedly attached to a top portion of the spindle shaft 225 can be configured to releasably secure, grasp, support, and/or otherwise hold the battery part 270 on the spindle shaft 225. An actuator 210 coupled to the fixture via a coupling member 212 (e.g., a rod or shaft) and a spring 214 can activate and/or deactivate the fixture.

A first motor 220 (e.g., an electrical motor, such as a rotary motor, a servo motor, etc.) disposed on a first platform 223 can include a receptacle 221 for receiving power (e.g., facility power from the power source 101f of FIG. 1) and can be configured to rotate the spindle shaft 225 via a first pulley 216. The first pulley 216 can be coupled to a second pulley 218. The second pulley 218 is coupled to the spindle shaft 225 via a belt 217 or other flexible drive member. The first motor 220 can be configured to receive operating instructions from the system controller 102 via the communication link 109 (FIG. 1). The operating instructions can include, for example, a speed at which to rotate the battery part 270, a number of rotational turns to rotate the battery part 270, and/or a time interval during which to rotate the battery part 270. As explained in more detail below in reference to FIGS. 7A and 7B, the system controller 102 can receive input from a user via a user interface (e.g., the user interface 101c) indicating one or more operating parameters for the first motor 220. The system controller 102 (e.g., via the processor 101a) can relay the parameters to the first motor 220, thereby allowing manual and/or automatic control of the rotation of the battery part 270. In some embodiments, for example, the first motor 220 can be an Alley-Bradley MP-Series™ Low-Inertia Motor. In other embodiments, however, the first motor 220 can be any suitable motor capable of rotating an object (e.g., the spindle shaft 225).

Figure 6:
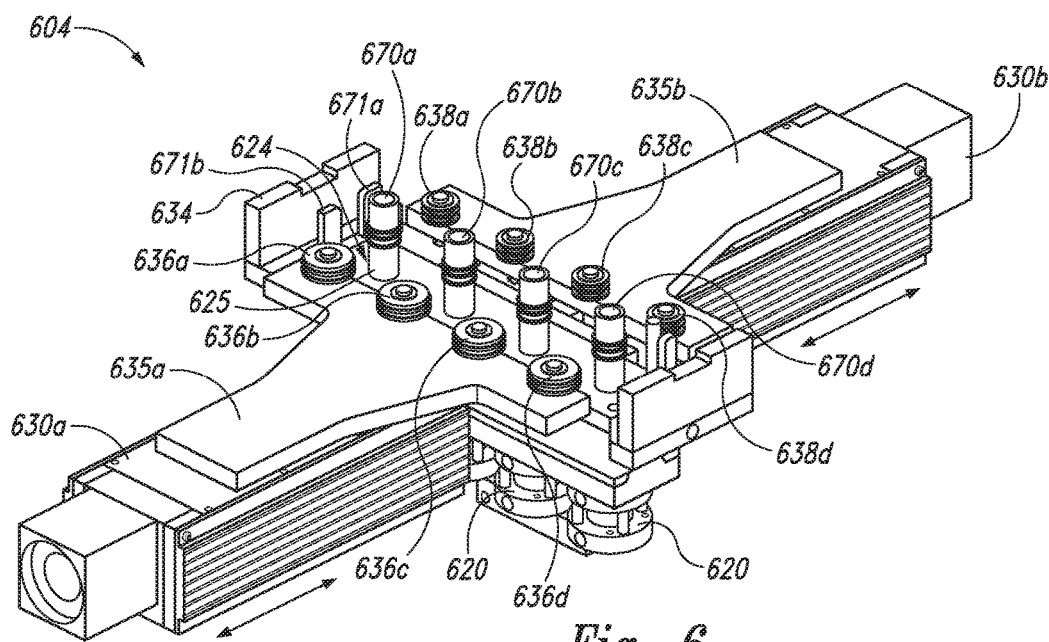
FIG. 6 is a side isometric view of a battery part manufacturing machine configured in accordance with an embodiment of the present disclosure.

A coupling structure 222 couples a second motor 230 (e.g., a linear motor, a linear drive, etc.) to the first platform 223 and the spindle shaft 225, thereby allowing the second motor 230 to move the spindle shaft 225 upwardly from a first or home position in which the battery part 270 is received (e.g., proximate to and/or just above the second platform 226) to a second position in which the battery part 270 is positioned adjacent to the tooling assembly 232. A receptacle 231 on the second motor 230 receives power from a power source (e.g., the power source 101f of FIG. 1). In the illustrated embodiment of FIGS. 2A-2F, for example, the second motor 230 is configured to move the battery part 270 vertically up and down on the spindle shaft 225 (e.g., along a path indicated by the arrows in FIG. 2A). In some embodiments, for example, the second motor 230 may include a LinTech® 160 or 170 Series motor. In other embodiments, for example, the second motor 230 may be any suitable motor capable of moving the battery part 270 on the spindle shaft 225 from the home position to the second position. In some other embodiments, for example, the second motor 230 may be capable of moving the battery part 270 horizontally as well (e.g., as shown in FIG. 6). Moreover, in the illustrated embodiment only one second motor 230 is shown. In other embodiments, however, the second motor 230 and a third motor may be used to move the spindle shaft 225 (e.g., as shown in FIG. 6).

The second motor 230 can be configured to receive operating instructions from the system controller 102 via the communication link 109 (FIG. 1). The operating instructions can include, for example, instructions for moving the spindle shaft 225 at a first linear speed in a vertical direction, for moving the spindle shaft 225 to the home position (e.g., the position at which the battery part 270 is received onto the spindle shaft 225), for moving the spindle shaft 225 to the second position (e.g., the height or position at which the tooling assembly 232 engages the battery part 270), and/or for performing a series of movements (e.g., up and down movements) while a portion of the tooling assembly 232 (e.g., a roller die) engages the battery part 270. As described above in reference to FIG. 1 and in further detail below in reference to FIGS. 7A and 7B, the system controller 102 can receive, from a user via a user interface (e.g., the user interface 101c), parameters for operating the first motor 220, thereby allowing manual and/or automatic control of the movement of the battery part 270 relative to the one or more tools of the tooling assembly 232.

The tooling assembly 232 includes a rotary actuator 240 operably coupled to a rotary platform 234 having a first arm 235a and a second arm 235b. The tooling assembly 232 further includes a first tool 236 rotatably mounted to the first arm 235a and a second tool 238 rotatably mounted to the second arm 235b (FIG. 2C), and each tool can be configured to perform one or more part manufacturing or finishing operations (e.g., burnishing, polishing, crimping, flaring, etc.) with respect to the battery part 270. The rotary actuator 240 is fixedly attached to an underside of the upper platform 208b and includes a receptacle 241 configured to receive power from a power source (e.g., the power source 101f of FIG. 1). As shown in more detail in FIG. 3B and described below in reference thereto, in operation the rotary actuator 240 can be configured to move the first tool 236 (e.g., a polishing wheel) and the second tool 238 (e.g., a crimping tool, a roller die, etc.) toward and/or away from the battery part 270. The tooling assembly 232 further includes a burnishing tool 250 fixedly attached to the underside surface of the upper platform 208b. The burnishing tool 250 configured to receive the battery part 270 therein before, during, and/or after tooling operations.

Embodiments of the present disclosure can produce a finished battery part (e.g., the finished battery part 180 of FIG. 1) having one or more sealing features that provide a labyrinth seal and/or other a tortuous path to prohibit acid from escaping a battery container (not shown). The embodiments described herein allow one or more tools (e.g., the second tool 238) having one or more forming portions to address, engage and/or form the battery parts. The parameters of, for example, vertical position (e.g., along a z-axis) of the battery part relative to the tools, horizontal position (e.g. along x-y axis and or a polar axis) of the tools relative to the battery part, and a rotational velocity of the battery part can all be automatically and/or manually adjusted such that a profile of a sealing feature on a finished battery part can be fully customized by a user without necessitating machine shutdown and/or disassembly.

FIG. 2F is an enlarged view of a portion of FIG. 2E. As shown in FIG. 2F, the first arm 235a of the rotary platform 234 includes a proximal end portion 337a (FIG. 3B) and a distal end portion 337b, and the second arm 235b includes a proximal end portion 339a and a distal end portion 339b. The first tool 236 is rotatably coupled to the distal end portion 337b of the first arm 235a by a bearing 362a allowing the first tool 236 to rotate freely. Similarly, the second tool 238 is rotatably coupled to the distal end portion 339b by a second bearing 362b also allowing the second tool 238 to rotate freely. The first tool 236 includes a plurality of polishing portions 360 (identified separately as a first polishing portion 360a, a second polishing portion 360b and a third polishing portion 360c). The first tool 236 also includes a first groove 361a formed between the first polishing portion 360a and the second polishing portion 360b, and a second groove 361b formed between the second polishing portion 360b and the third polishing portion 360c. In this embodiment, the battery part 270 includes a first sealing feature 371a (e.g., a first acid ring) and a second sealing feature 371b (e.g., a second acid ring). The first groove 361a and the second groove 361b are configured to receive the first sealing feature 371a and the second sealing feature 371b, respectively, to engage and/or polish portions of the first sealing feature 371a and/or the second sealing feature 371b. For example, an underside surface of the first polishing portion 360a, an upper surface of the second polishing portion 360b, and the first groove 361a can receive and polish the first sealing feature 371a therebetween. Similarly, an underside surface of the second polishing portion 360b, an upper surface of the third polishing portion 360c, and the second groove 361b can receive and polish the first sealing feature 371a therebetween.

The second tool 238 includes forming portions 364 (identified separately as a first forming portion 364a, a second forming portion 364b and a third forming portion 364c). A first groove 365a is formed between the first forming portion 364a and the second forming portion 364b, and a second groove 365b is formed between the second forming portion 364b and the third forming portion 364c. In the illustrated embodiment, the first groove 365a is configured to receive, for example, the first sealing feature 371a and the second groove 365b is configured to receive the second sealing feature 371b. As described in more detail below with reference to FIG. 3B, the forming portions 364 include structures configured to shape or otherwise transform the first sealing feature 371a and the second sealing feature 371b when the second tool 238 contacts the battery part 270.

Figure 3A:
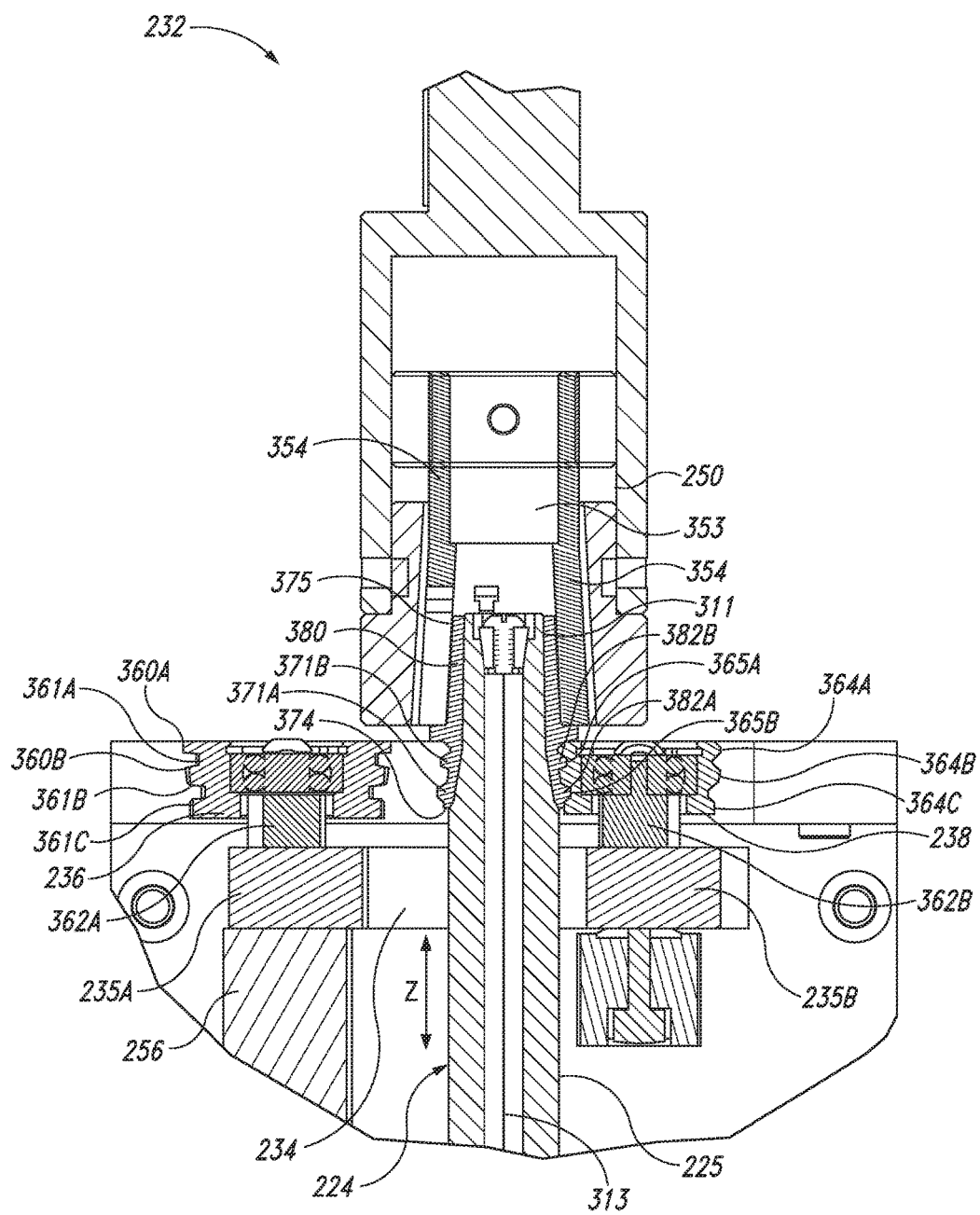
FIG. 3A is a cross-sectional front view of the battery part forming assembly of FIG. 2E.

FIG. 3A is a cross-sectional side view of the battery part forming assembly shown in FIG. 2F. A draw bar 313 extends through an hollow interior cavity of the spindle shaft 225 to couple the fixture 311 to the actuator 210 (FIG. 2A). The fixture 311 can be configured as, for example, a tapered mandrel or collet that cause the distal end of the spindle shaft 225 to expand when the collet is pulled downward into the spindle shaft 225. For example, when the spindle assembly 224 receives a battery part 380 thereon, the actuator 210 can pull the draw bar 313 downward thereby pulling the fixture 311 downward to, for example, expand the distal end of the spindle shaft 225 against an interior surface of the battery part 380 and grip the battery part 380. Moreover, when the battery part 380 is moved upward toward the first tool 236 and the second tool 238, a top or lug portion 375 of the battery part 380 is received in a cavity 353 of the burnishing tool 250. The burnishing tool 250 has an interior surface defining the cavity 353 and including burnishing surfaces or members 354 configured to engage and burnish an outer surface of the lug portion 375 as it spins within the cavity. In some embodiments, the burnishing tool 250 can also increase stability of the battery part 380 by at least partially securing the lug portion 375 as the battery part 380 is spun by the spindle assembly 224.

Figure 3B:
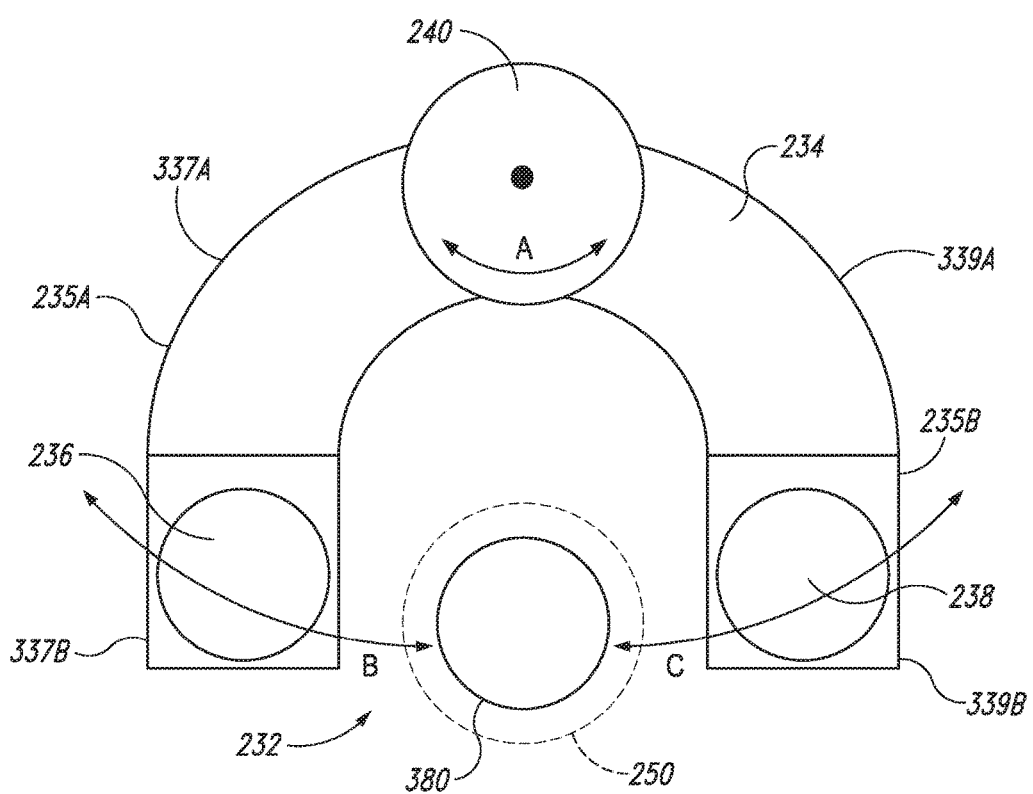
FIG. 3B is a schematic diagram illustrating a top view of the battery part forming assembly of FIG. 2E.

As described above in reference to FIGS. 2A-2F, the second motor 230 can move a battery part (e.g., the battery part 380) vertically upward or downward. An operator, for example, can change a position of the battery part 380 such that when the first tool 236 and the second tool 238 engage the battery part 380, the cross-sectional profile created on the battery part 380 can be adjusted or modified based on a height of the spindle assembly 224. Moreover, as shown in FIG. 3B, the lateral or horizontal position of the first tool 236 and the second tool 238 are also adjustable, thereby allowing the operator substantial adjustability of the final cross sectional profile for the battery part 380. The adjustable parameters can be adjusted manually or automatically and can be adjusted while the battery part 380 is received into the machine 204.

FIG. 3B is a schematic top view of portions of the tooling assembly 232. As described above, the first tool 236 and the second tool 238 can be moved toward and away from the battery part 380 in order to transform a profile of a first acid ring from a first cross-sectional shape to a second cross-sectional shape. For example, the rotary actuator 240 can rotate the first arm 235a and the second arm 235b counterclockwise or clockwise along an arrow A. When the rotary actuator 240 rotates the first arm 235a and the second arm 235b clockwise, for example, the second tool 238 can engage the battery part 380. Conversely, when the rotary actuator 240 rotates counterclockwise, the second tool 238 moves away from the battery part 380 and the first tool 236 can engage the battery part 380 along the direction shown by arrow B. As those of ordinary skill in the art will appreciate, there could be more than two forming tools.

The battery part 380 is shown in FIG. 3B just as the second tool 238 engages the battery part 380. When the second tool 238 first engages the battery part 380, the first sealing feature 371a and the second sealing feature 371b have a first profile with a first cross section (e.g., a generally rectangular cross section, a round cross section, etc.). As the second tool 238 continues to engage the battery part 380, the first sealing feature 371a and the second sealing feature 371b are transformed as the battery part 380 and the second tool 238 rotate relative to each other. The features 371 can be transformed to a profile having a second cross section such as those shown by the first finished acid ring 382a and a second finished acid ring 382b.

Figure 4A:
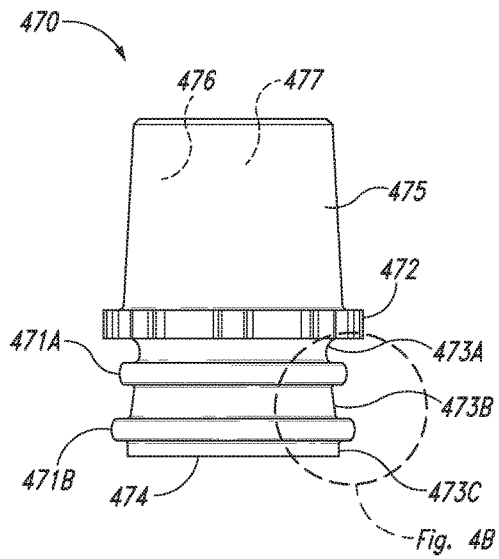
FIGS. 4A and 4B are side and enlarged side views, respectively, of a first battery part prior to tooling operations.
Figure 4B:
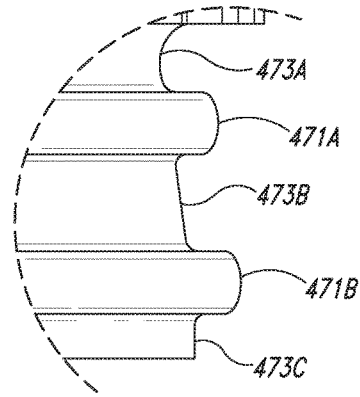

FIGS. 4A and 4B are side and enlarged side views, respectively, of a first battery part 470 prior to the tooling operations described above with reference to FIGS. 2A through 3B. The first battery part 470 includes a base portion 474 and a lug portion 475 having a cavity 477 with an inner surface 476 therethrough. A spline 472 is circumferentially formed between the lug portion 475 and the base portion 474. The base portion 474 further includes the first acid ring 471a, the second acid ring 471b, with a plurality of grooves 473 formed thereabout, (identified separately as a first groove 473a, a second groove 473b, and a third groove 473c. An enlarged view of a portion of the base portion 474 is shown in FIG. 4B. In the illustrated embodiment of FIGS. 4A and 4B, the first acid ring 471a and the second acid ring 471b are shown having a generally round or circular cross section. In other embodiments, for example, the first acid ring 471a and the second acid ring 471b may have a generally rectangular cross section. In further embodiments, the first acid ring 471a and the second acid ring 471b may have any profile. Moreover, in some embodiments the first acid ring 471a and the second acid ring 471b may have different shapes.

Figure 4C:
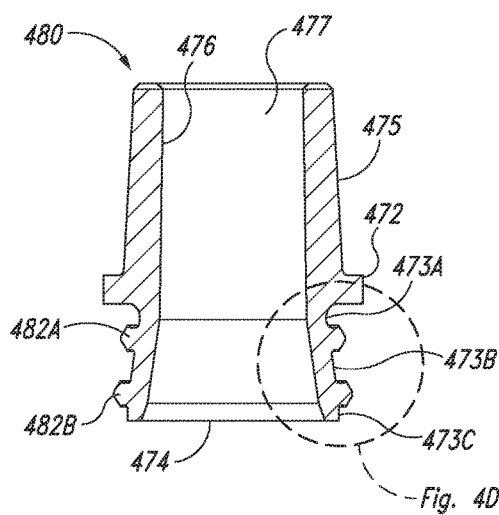
FIGS. 4C and 4D are side cross-sectional and enlarged side cross-sectional views, respectively, of a second battery part produced by the system of FIG. 1 in accordance with one or more embodiments of the present disclosure.
Figure 4D:
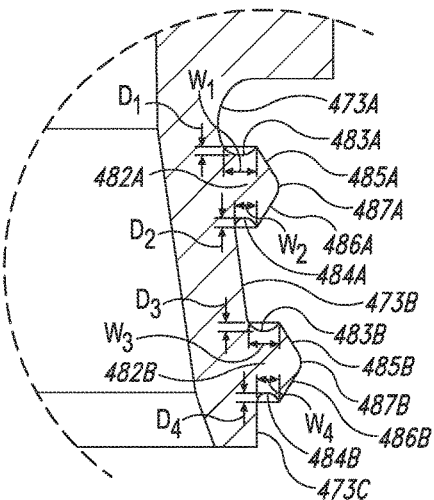

FIGS. 4C and 4D are side and enlarged side cross-sectional views, respectively, of a second battery part 480 produced, for example, by the manufacturing system 100 and/or the machine 204 as described above. As shown in FIGS. 4C and 4D, the second battery part 480 includes a first shaped acid ring 482a and a second shaped acid ring 482b. The first shaped acid ring 482a has a second profile different from a first profile of the first acid ring 471a. Similarly, the second shaped acid ring 482b has a fourth profile different from the second profile of the second acid ring 471b. As shown in FIG. 4D, the first shaped acid ring 482a includes a first lateral undercut portion 483a, a top angled portion 485a, a crown 487a, a second angled portion 486a and a second undercut portion 484a. The first lateral undercut portion 483a has a depth D1 and a width W1. Similarly, the second undercut portion 484a includes a depth D2 and a width W2. The second shaped acid ring 482b includes a third undercut portion 483b, a third angled surface 485b, a crown 487b, a fourth angled surface 486b and a fourth undercut portion 484b. The third lateral undercut portion has a depth D3 and a width W3. The fourth undercut portion has a width W4 and a depth D4.

Figure 5:
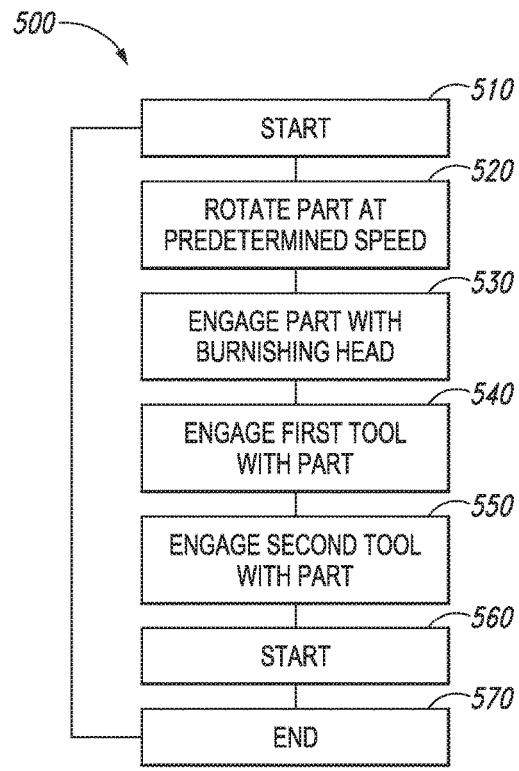
FIG. 5 is a flow diagram of a method of forming one or more acid rings on a battery part in accordance with one or more embodiments of the present disclosure.

FIG. 5 is a flow diagram of a routine 500 for forming one or more acid rings on a battery part in accordance with an embodiment of the present disclosure. The routine 500 can be stored, for example, in storage media contained in memory 101b (FIG. 1) and executed, for example, by the processor 101a in the system controller 102. At step 510 the routine 500 receives an indication from the battery forming machine, e.g., the machine 204, that a first battery terminal, e.g., the battery part 270, has been received. At step 520, the routine 500 executes instructions to the first motor 220 to rotate the spindle assembly 224 at a predetermined speed. In step 520, the routine 500 also instructs the spindle assembly 224 to receive the battery part 270 and engage the inner surface of the battery part 270 with the fixture 311. In step 530, the routine 500 instructs the spindle assembly 224 and the second motor 230 to move spindle assembly 224 upward such that the lug portion 375 of the battery part 270 is received into the burnishing tool 250. Simultaneously with burnishing and/or after burnishing, the first tool, such as, for example, 236 can receive instructions from the routine 500 to engage the battery part 270. The first tool 236 as described above can engage the battery part 270 and polish and/or perform other tooling operations on the battery terminal. In step 550, the routine 500 instructs the rotary actuator 240 to rotate such that the second tool 238 engages the battery part 270, thereby forming the acid rings on the battery part 270 from having a first cross-sectional profile to a second cross-sectional profile. In step 560, the battery terminal is lowered to a starting position where the battery terminal was originally received, and removed from the machine 204 such as, for example, being knocked off or engaged by the member 256 or being gripped by a robotic gripper (not shown). In step 570, the routine 500 ends or returns to the start of 510 to await another battery terminal.

FIG. 6 is a side isometric view of a battery part manufacturing machine 604 configured in accordance with an embodiment of the present disclosure. The machine 604 includes a first platform 635a and a second platform 635b coupled to a first actuator 630a and a second actuator 630b, respectively. In some embodiments, the first actuator 630a and the second actuator 630b can comprise, for example, a motor, a linear motor, hydraulic valve, a pneumatic valve and/or a ball screw. In other embodiments, however, the first actuator 630a and the second actuator 630b can comprise any suitable actuator or mover. The first actuator 630a and the second actuator 630b are configured to move the first platform 635a and the movable second platform 635b respectively toward and away from a plurality of battery parts 670 (identified separately as a first battery part 670a, a second battery part 670b, a third battery part 670c and a fourth battery part 670d) arranged therebetween. A plurality of polishing wheels 636 (identified separately as a first polishing wheel 636a, a second polishing wheel 636b, a third polishing wheel 636c, and a fourth polishing wheel 636d) are disposed on an end portion of the first platform 635a. A plurality of crimping wheels 638 (identified separately as a first crimping wheel 638a, a second crimping wheel 638b, a third crimping wheel 638c, and a fourth crimping wheel 638d) are disposed on an end portion of the second platform 635b. Each of the battery parts 670 is disposed onto a corresponding spindle assembly 624 (e.g., the spindle assembly 224 of FIGS. 2A-2F, a lathe, etc.) rotatably coupled to a corresponding rotary motor 620.

In operation, the first actuator 630a moves the first platform 635a with the polishing wheels 636 toward a support structure 634 holding the battery parts 670 and engaging them to polish a first acid ring 671a and a second acid ring 671b circumferentially formed around each of the battery parts 670. Next, the second actuator 630b moves the second platform 635b towards the support structure 634 and each of the crimping wheels 638 engages corresponding battery parts 670 to form acid rings on the battery parts 670 having a second profile different from a first profile on the battery parts 670. As described above with reference to the spindle assembly 224 of FIGS. 2A-2F, the spindle assembly 624 can be manually or automatically-adjustable height to allow an operator to adjust an angle and/or position at which individual polishing wheels 636 and/or crimping wheels 638 engage a corresponding battery part 670. The machine 604 therefore allows adjustments to a profile of individual battery parts 670 on the fly without an operator's needing to perform mechanical modifications to the machine 604. After the crimping is complete the battery parts 670 are removed and conveyed to a next station (e.g., the third manufacturing station 105 of FIG. 1) for further operations and/or packaging.

Figure 7A:
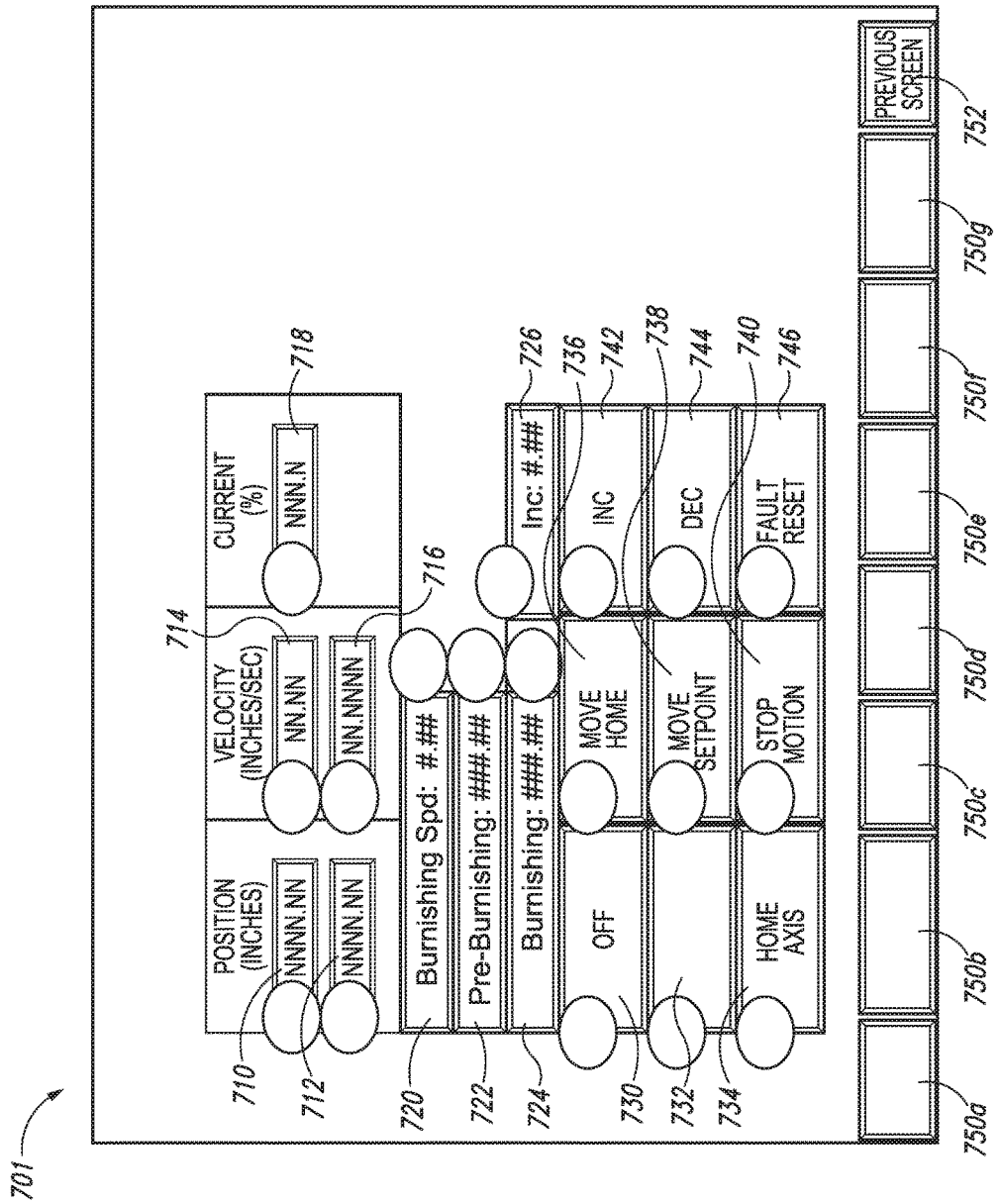
FIGS. 7A and 7B are displays of user interfaces for a battery part manufacturing system controller configured in accordance with an embodiment of the present disclosure.
Figure 7B:
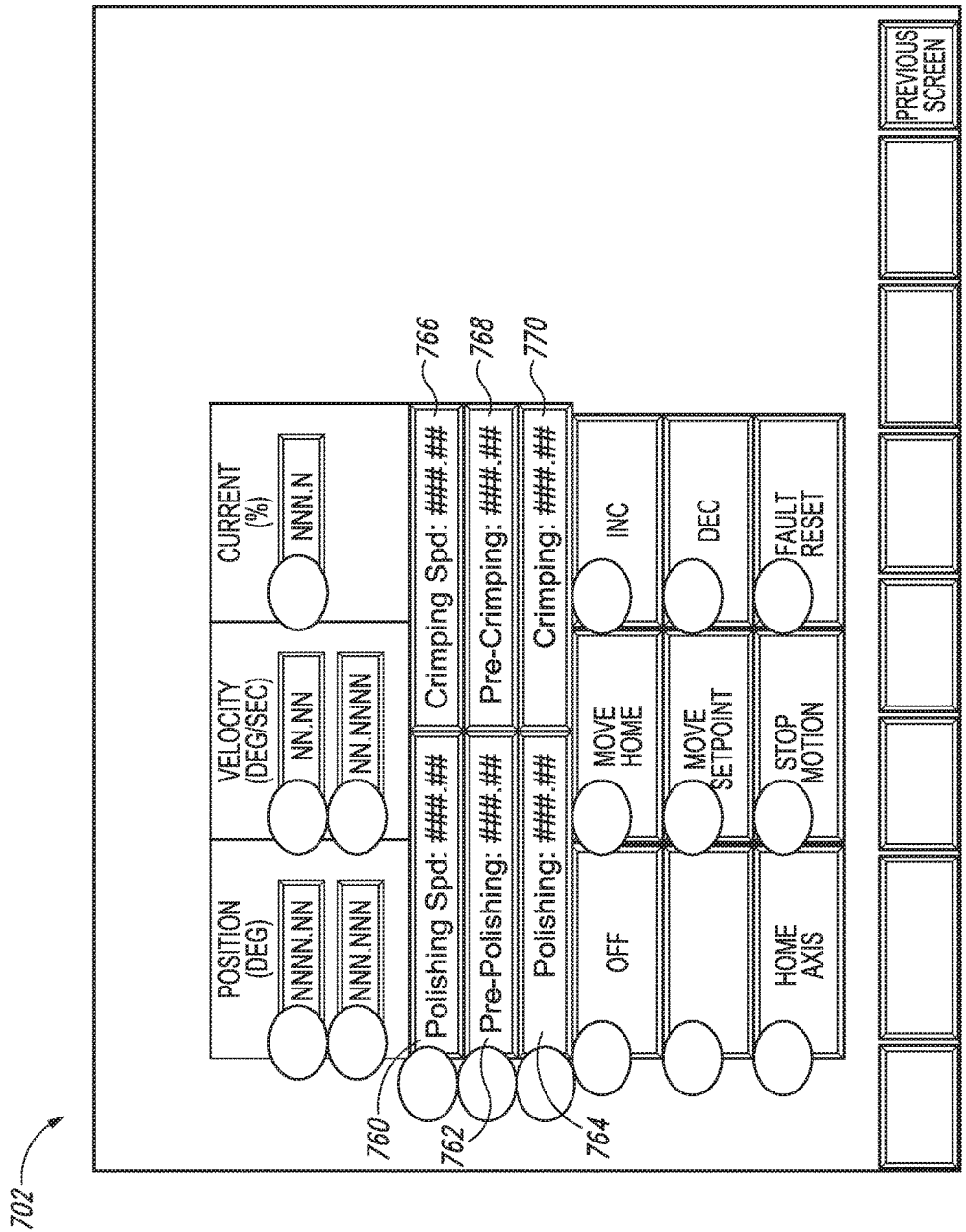

FIGS. 7A and 7B are screenshots of a user interface 701 (e.g., the user interface 101c of FIG. 1). A plurality of clickable, pushable, or otherwise engageable buttons, indicators, toggles, and/or user elements is shown within the user interface 701. An element 710 indicates a vertical position of the battery part relative to a start position, for example, the second platform 226 shown in FIGS. 2A and 2B. An element 712 indicates a user input position of a manually desired vertical position of the battery parts, e.g., the battery part 270, relative to the first position, e.g., the second platform 226. An element 714 indicates a rotational speed of the spindle assembly 224. An element 716 is an indication of a manually-input rotational speed allowing the user or operator of the manufacturing system 100 and the system controller 102 to input a rotational speed of the spindle assembly 224. An element 718 shows a current percentage such as, for example, a percentage of a maximum current output by the power 101f currently being utilized by the first motor 220. An element 720 indicates a rotational speed parameter for the spindle assembly 224 while the battery part 270 is located or engaged by the burnishing tool 250. An element 722 indicates a pre-burnishing height and an element 724 indicates a burnishing height or a height relative to the second platform 226 to which the battery part 270 should be vertically moved upward by the second motor 230. An element 730 indicates the current status of the machine. In the illustrated embodiment the machine is off, however, when the machine is operating, the element 730 can, for example, display on and/or manual mode. An element 732 shows a current status of the spindle assembly 224. An element 734 can indicate that the spindle assembly is currently positioned at a home position, i.e., a vertical height similar to or equal to the height of the second platform 226. An element 736 can receive via touch input from the user if he or she wishes to move the spindle assembly 224, having the battery part 270 to a home position such as a vertical position approximately equal to the second platform 226. An element 738 can be configured to receive touch input and instruct the second motor 230 to move the spindle assembly such that the battery part 270 is at a set position such as, for example, the position input into the element 712 by the user. An element 740 is configured to stop the rotational motion of the spindle assembly 224. An element 742 can allow a user to manually increase a height of the battery part by an amount input into the element 726. An element 744 can allow a user to decrease the vertical height of the battery part 270 by the amount indicated in, for example, the element 726. An element 746 can, if pressed by a user, indicate to a user whether a fault reset is required. Elements 750a-f at the bottom of the user interface 701 can be used, for example, to allow a user to toggle through or switch to other user interfaces and/or other control screens.

An element 752 allows a user to return to the user interface that he or she was viewing previously.

FIG. 7B is a user interface 702 that can be configured to control the tooling assembly 232. An element 760, for example, can allow a user to input a speed at which the rotary actuator 240 can move the first tool 236 laterally toward the battery part 270. An element 762 can allow a user to input a first position of the first tool 236 prior to polishing. An element 764 can allow the user to input a lateral position for polishing when the first tool 236 engages the battery part 270. Similarly, an element 766 can allow the user to input the speed at which the rotary actuator 240 moves the second tool 238 towards the battery part 270 during engagement. An element 768 allows the user to input a lateral position relative to the battery part 270 of the second tool 238 prior to engagement. An element 770 allows the user to input a lateral position relative to the battery part 270 during engagement.

Figure 8A:
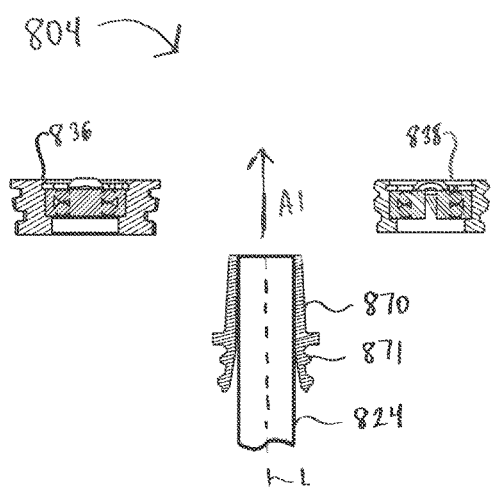
FIGS. 8A-8D are schematic diagrams illustrating a front view of a battery part manufacturing machine configured in accordance with an embodiment of the present disclosure.
Figure 8B:
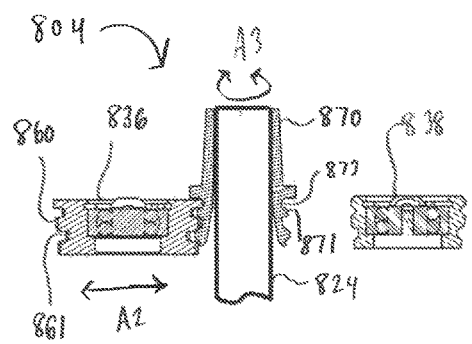
Figure 8C:
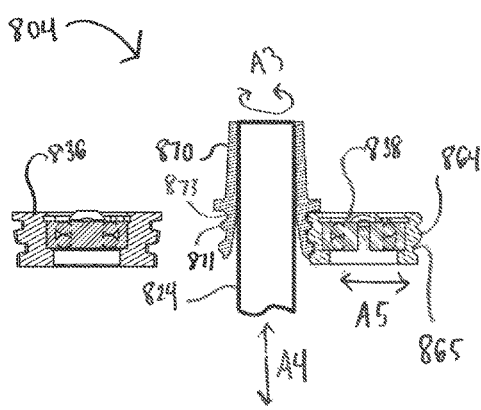
Figure 8D:
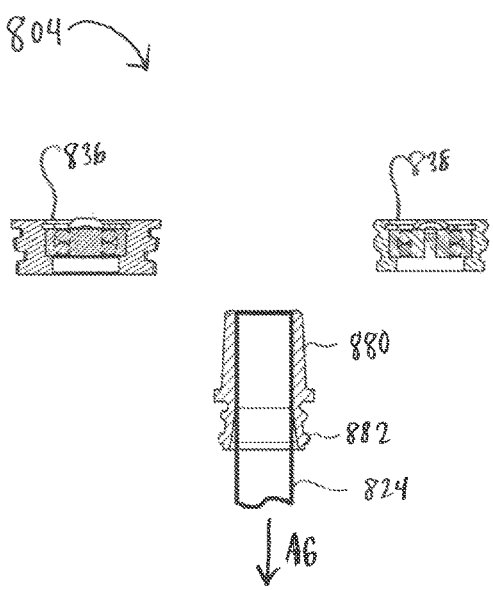

FIGS. 8A-8D are schematic diagrams illustrating a front view of a battery part manufacturing machine 804 (e.g., the machine 204 of FIGS. 2A-3B) during steps of a manufacturing process of forming a semi-finished battery part 870 (e.g., the battery part 270 of FIGS. 2A-3B) into a finished battery part 880 (FIG. 8D). The machine 804 includes a first tool 836 (e.g., the first tool 236 of FIGS. 2A-3B) and a second tool 838 (e.g., the second tool 238 of FIGS. 2A-3B). The first tool 836 and the second tool 838 can be configured to engage one or more sealing features 871 on the battery part 870 and transform a profile of the sealing features 871 from a first cross sectional shape (as shown in FIGS. 8A-8C) to a different, second cross sectional shape (as shown in FIG. 8D). For the sake of clarity, certain features and/or steps have been omitted from FIGS. 8A-8D.

Referring first to FIG. 8A, the battery part 870 is received (e.g., placed manually by an operator and/or automatically by a conveyer, a robotic arm, etc.) onto a lathe or spindle assembly 824 (e.g., the spindle assembly 224 of FIGS. 2A-3B) at a first position. The spindle assembly 824 can include a motor configured to move the battery part 870 from the first position in a direction indicated by arrow A1, substantially parallel to a longitudinal axis L of the spindle assembly.

In FIG. 8B, the battery part 870 is shown in a second position between the first tool 836 and the second tool 838. The first tool 836 is shown proximate the battery part 870 after having been moved (e.g., by an actuator) along a direction shown by arrow A2 (substantially perpendicular to the longitudinal axis L) toward the battery part 870. The first tool 836 includes one or more forming portions 860 configured to engage a corresponding groove 871 on the battery part 870. The first tool 836 also includes one or more grooves 861 configured to receive one or more sealing features 871 on the battery part 870. In the illustrated embodiment, the first tool 836 may be configured as a polishing tool configured to polish the individual sealing features 871 and/or grooves 861 while the spindle assembly 824 rotates the battery part 870 in the rotational direction indicated by arrow A3. In other embodiments, however, the first tool 236 can be configured as any suitable forming tool (e.g., a crimping tool, a die, etc.).

Referring to FIG. 8C, the first tool 836 is shown in its original position (e.g., the position shown in FIG. 8A) and the second tool 838 is shown after having been moved (e.g., by an actuator) toward the battery part 870 along a direction shown by arrow A5. The second tool 838 includes one or more forming portions 864 adjacent one or more grooves 865. The one or more forming portions 864 are configured to engage corresponding grooves 873 on the battery part 870, and the one or more grooves 865 are configured to receive one or more sealing features 871 on the battery part. While the battery part 870 is rotating on the spindle assembly 824, the second tool 836 can move away from and toward the battery part 870 in the direction of arrow A5. The spindle assembly 824 may also be move in the direction of arrow A4. As described above with reference to FIGS. 1-7B, the movements of the spindle assembly 824 and the second tool 838 can be coordinated to transform the profile of the sealing features 871 from the cross sectional shape to virtually any operator desired cross sectional shape automatically without a need to mechanically alter and/or reconfigure the machine 804.

FIG. 8D shows the finished battery part 880 with a sealing feature 882 having a second cross sectional shape (e.g., a hook-shape with an undercut). The finished battery part 880 is moved away from the first tool 836 and the second tool 838 along the direction indicated by arrow A6. The finished battery part 880 can be removed from the machine 804 manually by an operator or automatically (e.g., via a conveyer, robotic arm, etc.) for additional processing and/or for packaging.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural or singular number, respectively. Additionally, the words "herein," "above" and "below" and words of similar import, when used in this application, shall refer to this application as a whole and not to any particular portions of this application.

Aspects of the invention described in detail above can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention, such as the routines described above with reference to, for example, FIG. 5 may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

One skilled in the relevant art will appreciate that the concepts of the invention can be used in various environments other than location based or the Internet. In general, a display description may be in HTML, XML or WAP format, email format or any other format suitable for displaying information (including character/code-based formats, algorithm-based formats (e.g., vector generated), and bitmapped formats). Also, various communication channels, such as local area networks, wide area networks, or point-to-point dial-up connections, may be used instead of the Internet. The system may be conducted within a single computer environment, rather than a client/server environment. Also, the user computers may comprise any combination of hardware or software that interacts with the server computer, such as television-based systems and various other consumer products through which commercial or noncommercial transactions can be conducted.

From the foregoing, it will be appreciated that specific embodiments of the disclosure have been described herein for purposes of illustration, but that various modifications may be made without deviating from the spirit and scope of the various embodiments of the disclosure. Further, while various advantages associated with certain embodiments of the disclosure have been described above in the context of those embodiments, other embodiments may also exhibit such advantages, and not all embodiments need necessarily exhibit such advantages to fall within the scope of the invention. Accordingly, the invention is not limited, except as by the appended claims.

I claim:

1. A battery part manufacturing machine, comprising:
   a shaft;
   a motor coupled to a first portion of the shaft;
   a fixture attached to a second portion of the shaft and configured to receive and releasably secure a battery part having a sealing feature; and
   a tool having a forming portion, wherein the motor is configured to rotate the shaft to rotate the battery part, wherein the tool is movable in a first direction to move the forming portion into contact with the sealing feature of the rotating battery part, and wherein the tool is movable in a second direction to move the forming portion away from the sealing feature.

2. The machine of claim 1 wherein the forming portion is configured to contact the sealing feature of the rotating battery part to transform a profile of the sealing feature from a first cross-sectional shape to a second cross-sectional shape.

3. The machine of claim 1 wherein the motor is configured to selectively rotate the shaft between a first rotational velocity and a second rotational velocity.

4. The machine of claim 1 wherein the tool is a first tool, wherein the forming portion is a first forming portion, and wherein the machine further comprises a second tool having a second forming portion configured to contact the rotating battery part.

5. The machine of claim 4 wherein the second tool is positioned adjacent to the fixture and opposite the first tool, and wherein the second tool is movable in the first direction away from the fixture and in the second direction toward the fixture.

6. The machine of claim 5, further comprising a platform having a first arm and a second arm, wherein the first tool is disposed at an end portion of the first arm, and wherein the second tool is disposed at an end portion of the second arm.

7. The machine of claim 6, further comprising an actuator rotatably coupled to the platform, wherein the actuator is configured to rotate the platform in the first direction and the second direction.

8. The machine of claim 4 wherein the first tool is a polishing tool and the second tool is a crimping tool.

9. The machine of claim 4 wherein the motor is configured to rotate the shaft at a first rotational velocity when the first tool contacts the battery part, and wherein the motor is configured to rotate the shaft at a second rotational velocity when the second tool contacts the battery part.

10. The machine of claim 1 wherein the tool is a first tool, and wherein the machine further comprises:
    a first platform having an end portion proximate to the fixture, wherein the first tool is disposed at the end portion of the first platform, and wherein the platform is movable in the first direction and the second direction;
    a second platform having an end portion proximate to the fixture and opposite the end portion of the first platform; and
    a second tool disposed at the end portion of the second platform and having a polishing portion, wherein the second platform is movable in the second direction to move the polishing portion into contact with the rotating battery part.

11. The machine of claim 1 wherein the tool includes a plurality of adjacent forming portions, wherein the adjacent forming portions are separated by grooves, and wherein each groove is configured to receive a corresponding sealing feature of the battery part.

12. A battery part manufacturing machine, comprising:
    a shaft configured to support a battery part;
    a tool positioned adjacent to the battery part and movable in a first direction toward the battery part and in a second direction away from the battery part, wherein the tool includes a forming portion configured to engage a sealing feature of the battery part; and
    a motor coupled to the shaft, wherein the motor is configured to linearly move the shaft in a third direction and a fourth direction to move the battery part in the third direction and the fourth direction, respectively, and wherein the third and fourth directions are perpendicular to the first and second directions.

13. The machine of claim 12 wherein the motor is a first motor, and wherein the machine further comprises a second motor coupled to the shaft, wherein the second motor is configured to rotate the shaft to rotate the battery part.

14. The machine of claim 12 wherein the motor is configured to move the battery part successively in the third direction and the fourth direction a predetermined number of times when the forming portion engages the battery part.

15. The machine of claim 12, further comprising a burnishing tool positioned adjacent to the battery part, wherein the burnishing tool includes an interior surface defining a cavity, and wherein at least a portion of the interior surface includes burnishing members positioned to burnish an outer surface of a lug portion of the battery part when the battery part is inserted into the cavity.

16. The machine of claim 12, further comprising a collet coupled to the shaft, wherein the collet is configured to engage an interior surface of the battery part to support the battery part.

17. A battery part manufacturing machine, comprising:
    a shaft configured to support a battery part having a sealing feature; and
    a tool having a forming portion and positioned adjacent to the battery part, wherein the forming portion is configured to engage the sealing feature of the battery part, wherein the tool is rotatable about an axis of rotation, and wherein the axis of rotation of the tool is movable in a first direction toward the battery part and in a second direction away from the battery part.

18. The machine of claim 17, further comprising a motor coupled to the to the shaft and configured to rotate the shaft to rotate the battery part.

19. The machine of claim 17, further comprising a motor coupled to the shaft, wherein the motor is configured to linearly move the shaft in a third direction and a fourth direction, and wherein the third and fourth directions are perpendicular to the first and second directions.

20. The machine of claim 17 wherein the forming portion is configured to engage the sealing feature of the battery part to transform a profile of the sealing feature from a first cross-sectional shape to a second cross-sectional shape.

* * * * *